US011365306B2

(12) United States Patent
Giannini et al.

(10) Patent No.: US 11,365,306 B2
(45) Date of Patent: Jun. 21, 2022

(54) MICROBEADS COMPRISING SILICATE FIBRES WITH NEEDLE-SHAPED MORPHOLOGY OF NANOMETRIC SIZE, PREPARATION THEREOF, ELASTOMERIC COMPOSITIONS AND TYRES FOR VEHICLES COMPRISING THEM

(71) Applicant: Pirelli Tyre S.p.A., Milan (IT)

(72) Inventors: Luca Giannini, Milan (IT); Luciano Tadiello, Milan (IT); Thomas Hanel, Milan (IT); Jorge Perez Cacho, Saragossa (ES); Daniel Javier Julve Sebastian, Saragossa (ES); Emiliano Resmini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 194 days.

(21) Appl. No.: 16/765,677

(22) PCT Filed: Nov. 28, 2018

(86) PCT No.: PCT/IB2018/059405
§ 371 (c)(1),
(2) Date: May 20, 2020

(87) PCT Pub. No.: WO2019/106562
PCT Pub. Date: Jun. 6, 2019

(65) Prior Publication Data
US 2020/0299482 A1    Sep. 24, 2020

(30) Foreign Application Priority Data

Nov. 29, 2017  (IT) .................. 102017000137322

(51) Int. Cl.
| | | |
|---|---|---|
| *C08K 3/36* | (2006.01) | |
| *C08K 9/00* | (2006.01) | |
| *B60C 1/00* | (2006.01) | |
| *C08K 7/10* | (2006.01) | |
| *C08L 19/00* | (2006.01) | |

(52) U.S. Cl.
CPC ............. *C08K 3/36* (2013.01); *B60C 1/0016* (2013.01); *B60C 1/0025* (2013.01); *C08K 7/10* (2013.01); *C08K 9/00* (2013.01); *C08L 19/00* (2013.01); *B60C 2001/0033* (2013.01); *C08K 2201/003* (2013.01); *C08K 2201/011* (2013.01)

(58) Field of Classification Search
CPC ................................ C08K 9/00; B60C 1/0016
See application file for complete search history.

(56) References Cited

U.S. PATENT DOCUMENTS

| | | |
|---|---|---|
| 4,029,633 A | 6/1977 | Hagopian et al. |
| 4,537,699 A | 8/1985 | Jas |
| 5,403,570 A | 4/1995 | Chevallier et al. |
| 6,040,364 A | 3/2000 | Mabry et al. |
| 6,048,923 A | 4/2000 | Mabry et al. |
| 6,075,084 A | 6/2000 | Mabry et al. |
| 6,335,396 B1 | 1/2002 | Chevallier et al. |
| 6,841,606 B2 | 1/2005 | Yanagisawa et al. |
| 6,929,783 B2 | 8/2005 | Chung et al. |

FOREIGN PATENT DOCUMENTS

| | | |
|---|---|---|
| EP | 1676112 A1 | 7/2006 |
| EP | 2292689 A1 | 3/2011 |
| FR | 2536380 | 5/1984 |
| WO | WO 02051749 A1 | 7/2002 |
| WO | WO 2005/043106 A1 | 5/2005 |
| WO | WO 2006/068078 A1 | 6/2006 |
| WO | WO 2006/080852 A1 | 8/2006 |
| WO | WO 2007/048424 A1 | 5/2007 |
| WO | WO 2009/099623 A1 | 8/2009 |
| WO | WO 2011/034589 A2 | 3/2011 |
| WO | WO 2013/053375 A1 | 4/2013 |
| WO | WO 2016/174628 A1 | 11/2016 |
| WO | WO 2016/174629 A1 | 11/2016 |
| WO | WO 2018/078500 A1 | 5/2018 |

OTHER PUBLICATIONS

International Search Report form the European Patent Office in corresponding International Application No. PCT/IB2018/059405 dated Feb. 27, 2019.
Written Opinion of the International Searching Authority from the European Patent Office in corresponding International Application No. PCT/IB2018/059405 dated Feb. 27, 2019.

*Primary Examiner* — Vickey Nerangis
(74) *Attorney, Agent, or Firm* — Finnegan, Henderson, Farabow, Garrett & Dunner, L.L.P.

(57) ABSTRACT

Microbeads are described, comprising silica fibres with needle-shaped morphology of nanometric size, characterised by reduced dustiness and good dispersibility in elastomeric materials, a process for the preparation thereof and the use thereof in the production of vehicle tyres.

21 Claims, 5 Drawing Sheets

US 11,365,306 B2

Figure 1:
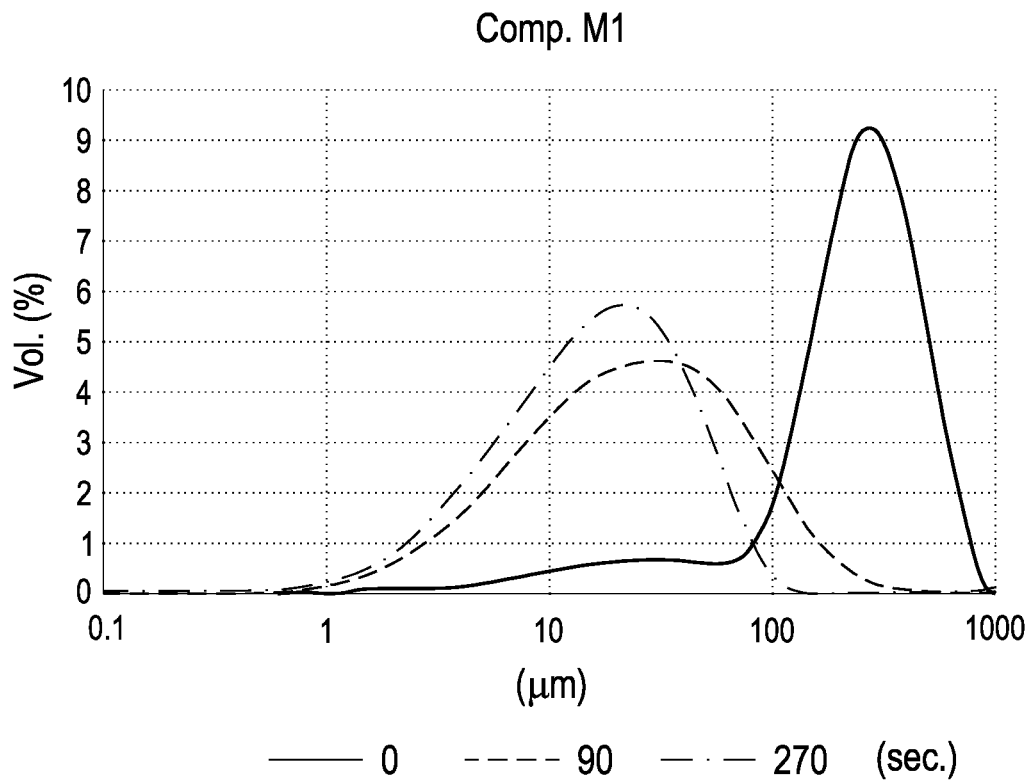

MICROBEADS COMPRISING SILICATE FIBRES WITH NEEDLE-SHAPED MORPHOLOGY OF NANOMETRIC SIZE, PREPARATION THEREOF, ELASTOMERIC COMPOSITIONS AND TYRES FOR VEHICLES COMPRISING THEM

This application is a national phase application under 35 U.S.C. § 371 based on International Application No. PCT/IB2018/059405, filed Nov. 28, 2018, and claims priority of Italian Patent Application No. 102017000137322, filed Nov. 29, 2017; the contents of each application is incorporated herein by reference.

FIELD OF THE INVENTION

The present invention relates to a composition in the form of microbeads comprising silica fibres with needle-shaped morphology of nanometric size, characterised by reduced dustiness and good dispersibility in elastomeric materials, and the use thereof in the production of vehicle tyres.

PRIOR ART

In the rubber industry, and more particularly in the tyre industry, it is typical to add reinforcing fillers to the elastomeric compositions in order to improve the mechanical properties and the abrasion resistance of the elastomeric materials obtained therefrom by vulcanisation.

Due to its high reinforcing power, carbon black is the most commonly used filler in the field.

Other currently used reinforcement materials are so-called "white" fillers, such as talc, kaolin, bentonite, titanium dioxide, silica, silicate fibres such as sepiolites and modified sepiolites, fillers that can partially or completely replace carbon black in elastomeric materials and impart a lower hysteresis to the latter maintaining a sufficient reinforcement.

Among the white fillers, the silicate fibres, more particularly the sepiolites and the modified sepiolites, have proved particularly promising in terms of hysteretic and mechanical properties of the elastomeric materials in which they are incorporated, in place of or in addition to the traditional fillers, and proved to give the tyres reduced rolling resistance, better stiffness and abrasion resistance.

At the industrial level, the direct incorporation of these nanometric fibres into elastomeric materials, generally carried out in conventional batch mixers, such as open mixers, or internal mixers of the tangential rotor type, such as for example Banbury®, or with interpenetrating rotors, Intermix type, appears to be difficult due to the high dustiness of these fibres.

In fact, once dried from the residual water, coming from the extraction process from the original minerals or from any subsequent derivatization reactions, these fibres assume a powdery consistency, with a low apparent density which, for example in the case of organically modified sepiolite (Pangel B5 by Tolsa) is about 210 g/l and in the case of unmodified sepiolite (Pangel S9 by Tolsa) decreases further to 60 g/l. Due to the high dustiness, these fibres easily disperse in the air and are difficult to handle and add to the other components in the mixers, creating problems of dosage, dispersibility, contamination of the working environment, potential toxicity for the operators and possible damage to the machines themselves, especially moving parts. In the presence of fine powders, the pneumatic conveying systems commonly used to convey the fibres to the mixers are easily clogged and require continuous maintenance.

To avoid these drawbacks, which commonly occur in the use in industrial plants of dusty compounds, one could resort to their incorporation in solid masterbatch compositions (MB), compositions that trap the powders in dense matrices making them more easily manageable, as described, for example, in documents WO2007048424A1 for bentonite type lamellar fillers or WO2009/099623, WO2011/034589, EP2292689, U.S. Pat. Nos. 4,029,633, 6,075,084, 6,048,923, 6,040,364, 6,929,783, WO2006/068078 and WO2006/080852, for carbon black, or finally U.S. Pat. No. 6,841,606, for carbon black, silica or inorganic fillers. However, to date no masterbatches of silicate fibres with needle-shaped morphology of nanometric size are known.

A possible alternative, however, applied to silica and described for example in documents U.S. Pat. No. 6,335,396 and WO02051749 on behalf of Rhodia or U.S. Pat. No. 5,403,570 on behalf of Rhone-Poulenc, consists in preparing silica aggregates by drying by nebulisation of suspensions thereof in aqueous medium. The aggregates resulting from this process are spherical microbeads of average diameter generally larger than 80-100 microns, non-pulverulent, able then, when incorporated in the elastomeric materials, to disaggregate and to disperse the silica well in the matrix.

The disaggregation of the microbeads in the elastomeric matrix during mixing is important for the filler to be distributed uniformly and in the finest possible form, exerting its reinforcement action at its best.

The patent application WO2013053375A1 on behalf of Industrias Quimicas del Ebro describes the combined use of precipitated silica and lamellar crystalline silicates as reinforcing fillers for elastomers. These fillers are not co-processed before incorporation into the elastomer but added directly into the mixer as separate ingredients. The document does not mention or suggest the use of silicate fibres with needle-shaped morphology nor does it deal with the problem of dustiness of the fillers.

The patent application WO2016/174628A1 on behalf of Pirelli describes reinforcement materials consisting of needle-shaped silicate fibres superficially modified by precipitation of amorphous silica. These materials maintain the same morphology and dustiness of the original fibres.

In conclusion, to date no methods are known to the Applicant which allow industrially utilizing silicate fibres with needle-shaped morphology of nanometric size, in particular as reinforcing fillers in the preparation of elastomeric materials for tyres, without incurring all the drawbacks deriving from their high dustiness discussed above.

SUMMARY OF THE INVENTION

The Applicant has set himself the goal of solving the problems deriving from the excessive dustiness of silicate fibres with needle-shaped morphology of nanometric size in order to be able to effectively use them in the preparation of elastomeric compositions for tyres, possibly with economically advantageous and easily industrially practicable solutions.

To the knowledge of the Applicant, unlike the silica microbeads, microbeads of silicate fibres with needle-shaped morphology, in particular sepiolite fibre microbeads, or organically and/or acids modified silicate fibres with needle-shaped morphology are not known or available on the market.

Considering that the silica microbeads would seem to respond perfectly to the present purposes, solving the issue of dustiness and being easy and convenient to be prepared, the Applicant undertook a feasibility study of microbeads of silicate fibres with needle-shaped morphology, in particular sepiolite, following substantially the procedure and the drying conditions by nebulisation of aqueous suspensions illustrated for silica in document WO02051749 on behalf of Rhodia Chimie, but with totally unsatisfactory results.

In fact, while for silica it is possible to prepare concentrated aqueous suspensions with a solids content of at least 20% by weight and above, perfectly atomisable, in the case of sepiolite due to the markedly more viscosifying effect thereof, the aqueous suspensions of equal content in solids are difficult to spray with conventional systems, because they are too viscous. In order to be able to dry these suspensions by nebulisation, it is necessary to dilute them significantly until they have a solids content of at most around 8-10% by weight or even less.

Even thinking of optimizing ad hoc the drying conditions by spraying or using different technologies such as drying in the stove, this would still result in energy-intensive processes with a low hourly productivity, industrially unfeasible due to the excessively high volumes of water to evaporate.

It follows that not only the drying process by nebulization of these diluted suspensions requires much higher time and energy consumption, industrially unacceptable, but also the quality of microbeads is much worse, with the formation of aggregates inhomogeneous in granulometry, fragile and comprising large amounts of non-agglomerated residual fine powders.

The Applicant has surprisingly found that if such aqueous suspensions of silicate fibres with needle-shaped morphology of nanometric size are admixed with silica it is instead possible to industrially prepare the microbeads with a high content of such fibres by drying by nebulisation of those aqueous suspensions.

In the presence of silica, quite unexpectedly considering that it too is a viscosifying agent, the viscosity of the aqueous suspensions of the fibres visibly decreases to the point of allowing the drying by nebulisation of suspensions with a large fibre content and the preparation of microbeads of a certain diameter, stable and only with traces of fine powders, on industrially feasible and economically advantageous conditions.

While not wanting to be bound to any specific explanation, the Applicant hypothesizes that silica is able to disturb the interparticle attracting interactions within the fibre suspension. From the literature it is known that interparticle interactions contribute in a significant manner to the viscosity of the concentrated suspensions as reported for example in the book "Formulation Technology: Emulsions, Suspensions, Solid Forms" by Hans Mallet, Wiley, 2001, in paragraphs 1.4.2, 2.1.2 and 5.6.3.

According to the Applicant, silica could significantly reduce these interactions, decreasing the resistance to flow and improving the processability of the suspension.

An aspect of the present invention is therefore a microbeads with an average diameter of at least 50 microns, comprising A) silica and B) silicate fibres with needle-shaped morphology of nanometric size, wherein said silica A and said fibres B are in weight ratio of between 0.5:1 and 15:1 and, in total, constitute at least 90% by weight of the dried microbead.

A further aspect of the present invention is a process for preparing a microbead, comprising silica A and silicate fibres with needle-shaped morphology of nanometric size B. said process comprising providing an aqueous suspension comprising said silica A and said fibres B in weight ratio A/B of between 0.5:1 and 15:1, preferably between 0.7:1 and 10:1, and in a total amount A+B equal to at least 5% by weight in relation to the weight of the suspension, and drying said aqueous suspension by nebulisation.

A further aspect of the present invention is a microbead according to the invention prepared according to the process of the invention.

A further aspect of the present invention is a vulcanisable elastomeric composition for components of tyres comprising at least (a) 100 phr of at least one diene elastomer, (b) from 2 to 120 phr of microbeads according to the first aspect of the invention, (c) 0 to 120 phr of a standard reinforcing filler, (d) 0.1 to 15 phr of a vulcanising agent, and (e) 0.1 to 20 phr of a coupling agent.

A further aspect of the present invention is a tyre component comprising a vulcanisable elastomeric composition of the invention, or vulcanised, obtainable by vulcanisation thereof.

A further aspect of the present invention is a tyre for vehicle wheels comprising at least one component according to the invention.

BRIEF DESCRIPTION OF THE FIGURES

FIGS. 1 and 2 show the granulometric distribution curves based on the volume of the comparative microbeads M1 and of the invention M2 prepared in Example 1, as such and with increasing time of ultrasonication in water (in particular at 90 and 270 seconds).

FIGS. 3 and 4 show the granulometric distribution curves based on the volume of the comparative microbeads M3 and of the invention M4 prepared in Example 2, as such and with increasing time of ultrasonication in water.

FIGS. 5 and 6 show the granulometric distribution curves based on the volume of the comparative microbeads M5 and of the invention M6 prepared in Example 3, as such and with increasing time of ultrasonication in water.

FIGS. 7 and 8 show the granulometric distribution curves based on the volume of the comparative microbeads M9 and of the invention M8 prepared in Example 4, as such (time 0) and after 390 seconds of ultrasonication in water.

FIG. 9 is a representation of a car tyre comprising the microbeads according to the invention in one or more components.

DETAILED DESCRIPTION OF THE INVENTION

The present invention is characterized by one or more of the following preferred aspects, taken individually or in combination.

For the purposes of the present description and of the following claims, the term "phr" (parts per hundreds of rubber) denotes the parts by weight of a given component of the elastomeric composition by 100 parts by weight of the diene elastomeric polymer.

A first aspect of the present invention is represented by a microbead.

The term "microbeads" refers to a particle having a substantially spheroidal shape and with an average diameter of at least 50 microns and less than 500 microns. The average diameter of the microbeads can be determined by means of granulometric analysis by laser diffraction or Dynamic Light Scattering (DLS) according to ISO13320.

The term "average diameter" means the average hydrodynamic diameter.

The term "average hydrodynamic diameter" refers to the diameter of an equivalent spherical particle in terms of diffusion, i.e. the spherical particle which diffuses in water at the same speed as the particle under examination.

The microbead according to the present invention is characterized by an average diameter preferably of at least 60, more preferably at least 70 or 80 microns.

The microbead according to the present invention is characterized by an average diameter preferably comprised between 60 and 400 microns, more preferably between 70 and 300 microns, even more preferably between 80 and 250 microns.

Advantageously, the microbeads according to the present invention comprise fine powders, i.e. particles with an average diameter of less than 50 microns, in an amount lower than 15%, preferably less than 10% by weight, measured according to ISO13320 method, The microbead according to the present invention comprises:
A silica, and
B silicate fibres with needle-shaped morphology of nanometric size,
in a weight ratio NB preferably comprised between 0.7:1 and 10:1, between 0.7:1 and 5:1, more preferably between 0.8:1 and 3:1, even more preferably between 0.9:1 and 2.5:1 or 0.9:1 and 1.1:1.

A and B together represent at least 90%, preferably at least 95% by weight of the dried microbead.

The 100% by weight component may comprise salts such as sodium sulphate, sodium chloride, magnesium sulphate or magnesium chloride, and traces of residual solvents.

The microbead according to the present invention comprises silica A selected from pyrogenic silica, precipitated silica and mixtures thereof.

Preferably, one or more precipitated amorphous silica are used in the microbead according to the invention.

Preferably, precipitated amorphous silica are used, with a BET surface area (measured according to the ISO Standard 5794/1) of between 50 m²/g and 500 m²/g, preferably between 70 m²/g and 200 m²/g.

Commercial examples of silica A are the Zeosil 1165 MP silica from Rhodia, the ULTRASIL 7000 from Evonik and the Ebrosil H-155 AT from IQE.

The microbead according to the present invention comprises silicates fibres B with needle-shaped morphology of nanometric size.

Preferably, the content of silicates fibres B with needle-shaped morphology of nanometric size in the microbead according to the invention is at least 5%, preferably at least 10%, at least 20%, at least 30% or at least 40% by weight in relation to the weight of the dried microbead.

Preferably, the content of silicates fibres B with needle-shaped morphology of nanometric size in the microbead according to the invention is between 5% and 65%, preferably between 10% and 60% or between 30% and 55% by weight in relation to weight of dried microbead.

The term "needle-shaped morphology fibres" means fibres having a dimension (length) much greater than the diameter or the maximum cross-sectional dimension. In particular, it is meant that said fibres have a ratio between the largest dimension (length) and the diameter or the maximum cross-sectional dimension (average aspect ratio) of at least 2:1, preferably of at least 3:1, more preferably of at least 5:1 or at least 101.

Preferably, the fibres have an average aspect ratio not greater than 1000:1, more preferably not greater than 100:1.

Preferably, said average aspect ratio is evaluated by microscopic observation, preferably performed on at least one hundred fibres.

Preferably, at least 70%, 80%, 90% of the fibres have the above average aspect ratio.

The expression "nanometric size" referred to fibres means that the fibres have a diameter or maximum cross-sectional dimension of less than 500 nm.

Preferably, said fibres have a diameter or a maximum cross-sectional dimension of between 1 and 100 nm, more preferably of between 5 and 50 nm, even more preferably of between 15 and 20 nm.

Preferably, said fibres have a length of less than 10 microns, more preferably between 0.1 and 10 microns, even more preferably of between 0.1 and 5 microns.

The silicate fibres with needle-shaped morphology differ from lamellar silicates, such as bentonite, alloisite, vermiculite or hydrotalcite, at least in the average aspect ratio. More particularly, considering a particle having three dimensions a, b, c where a>b>c, a particle can be defined lamellar when (3×a/b)<b/c, while a particle can be defined needle-shaped when (2×a/b)>b/c.

Silicate fibres with needle-shaped morphology of nanometric size are selected from the group consisting of magnesium and/or aluminium and/or calcium silicate fibres and mixtures thereof.

Preferably, the silicate fibres with needle-shaped morphology of nanometric size are selected from 2:1 phyllosilicates characterized by an "inverted ribbons" structure as described in "Bergaya, F., Jaber, M. and Lambert, J.-F. (2011) Clays and Clay Minerals, in Rubber-Clay Nanocomposites: Science, Technology, and Applications (ed M. Galimberti), John Wiley & Sons, Inc., Hoboken, N.J., USA. doi: 10.1002/9781118092866.ch1"

Preferably, the silicate fibres with needle-shaped morphology of nanometric size are selected from sepiolite fibres, modified sepiolite fibres, paligorskite fibres (also known as attapulgite), wollastonite fibres, imogolite fibres and mixtures thereof, more preferably they are sepiolite fibres, modified sepiolite fibres or mixtures thereof.

Generally, sepiolite is needle-shaped and has average aspect ratios of from 3:1 to 1000:1, more commonly from 5:1 to 100:1.

Generally, wollastonite is needle-shaped and has average aspect ratios of from 3:1 to 20:1, more commonly from 10:1 to 20:1.

Generally, imogolite is needle-shaped and has average aspect ratios of from 5:1 to 100:1, more commonly from 5:1 to 50:1.

Examples of silicate fibres which can be used according to the present invention are the sepiolites marketed by Tolsa Group (http://www.tolsa.com/) under the name of Pangel S9 or Pansil 100.

In the present context, the term "silicate fibres with needle-shaped morphology of nanometric size" generally means also modified fibres, i.e. the fibres obtainable from silicate fibres with needle-shaped morphology of nanometric size by reaction of partial acid degradation, partial removal of magnesium, derivatization—such as salification with organic compounds or silanization, or superficial deposition of other compounds, for example amorphous silica.

The silicate fibres with needle-shaped morphology of nanometric size may be obtained from silicate fibres with needle-shaped morphology of nanometric size selected from sepiolite fibres, paligorskite fibres (also known as attapulgite), wollastonite fibres, and mixtures thereof, more preferably modified sepiolite fibres or mixtures thereof.

In the present context, "modified silicate fibres with needle-shaped morphology of nanometric size", in particular with "modified sepiolite fibres" means for example the fibres modified by acid treatment with partial removal of magnesium up to a final content thereof comprised between 3.8% and 12%, which substantially retain the needle-like morphology and the original crystalline structure, described and exemplified in the patent application WO2016/174629A1 (in particular from page 9 to page 15 and from page 30 to page 36), on behalf of the Applicant, incorporated herein by reference.

These acid-modified fibres may be optionally further derivatised, for example by addition of at least one silanising agent to the acid treatment suspension of the fibres. Preferably, the silanising agent is selected from mono- or bifunctional silanes with one or two or three hydrolysable groups such as bis-(triethoxysilylpropyl)disulphide (TESPD), bis [3-(triethoxysilyl)propyl]tetrasulphide (TESPT), 3-thio-octanoyl-1-propyltrietoxysilane (NXT), $Me_2Si(OEt)_2$), $Me_2PhSiCl$, $Ph_2SiCl_2$, more preferably it is selected from TESPD and TESPT.

Other examples of suitable modified fibres are the silicate fibres with needle-shaped morphology of nanometric size comprising amorphous silica deposited on the surface, described and exemplified in the patent application WO2016/174628A1 (in particular from page 7 to page 12 and from page 22) on page 23) on behalf of the Applicant, incorporated herein by reference, or the sepiolite fibres organically modified by reaction with quaternary ammonium salts (for example talloyl benzyl dimethyl ammonium chloride) such as those marketed by Tolsa under the name Pangel B5.

Finally, the term "silicate fibres with needle-shaped morphology of nanometric size" also includes possible mixtures of one or more of said fibres and/or one or more of said modified fibres.

Preferably, said "silicate fibres with needle-shaped morphology of nanometric size" are sepiolite or modified sepiolite fibres, for example but not only, for treatment with acids, described in documents WO2016/174629A1 and WO2018078500A1 (IT102016000108318), by derivatization with quaternary ammonium salts (for example Pangel B5 of Tolsa) or by deposition on the surface of nascent silica according to the process reported in the document WO2016/174628A1.

The microbead according to the invention has an overall content of residual water, after drying, generally less than 12% by weight, typically less than 8% by weight, for example between 4.5 and 7.5% by weight in relation to weight of the microbead.

In a preferred embodiment, the microbead according to the present invention comprises the silica A and the silicate fibres B with needle-shaped morphology of nanometric size, wherein the fibres are sepiolite fibres or modified sepiolite fibres, and wherein the weight ratio A/B is between 0.9:1 and 1.1:1, preferably around 1:1.

In a preferred embodiment, the microbead according to the present invention comprises the silica A and the sepiolite fibres or modified sepiolite fibres B, wherein the weight ratio A/B is between 0.9:1 and 1.1, preferably around 1:1, and wherein said silica A and said fibres B in total constitute at least 90% by weight of the dried microbead.

In a preferred embodiment, the microbead according to the present invention comprises the silica A and the sepiolite fibres or modified sepiolite fibres B, and wherein the weight ratio A/B is between 0.9:1 and 1.1, preferably around 1:1 and said microbead has an average diameter of at least 70 microns.

In a preferred embodiment, the microbead according to the present invention comprises the silica A and the sepiolite fibres or modified sepiolite fibres B, wherein the weight ratio A/B is between 0.9:1 and 1.1:1, preferably around 1:1, and said microbead has an average diameter d of at least 80 microns, and wherein said silica A and said fibres B in total constitute at least 90% by weight of the dried microbead. The microbeads according to the present invention are particularly advantageous for use as elastomer reinforcement materials, in particular elastomers for tyres.

Within the scope of the invention is a powder consisting of the microbeads mentioned above and fine powders thereof with an average diameter of less than 50 microns, wherein said fine powders are present in the powder in amounts of less than 15%, preferably less than 10% by weight of the powder.

A further aspect of the present invention relates to a process for the preparation of a microbead as described above.

The process according to the present invention is characterised by one or more of the following parameters taken alone or in combination.

Said process comprises providing an aqueous suspension comprising said silica A and said fibres B in weight ratio A/B of between 0.5:1 and 15:1 and in a total amount A+B equal to at least 5% by weight in relation to the weight of the suspension.

Preferably, the aqueous suspension comprises the silica A and the fibres B in a weight ratio A/B comprised between 0.7:1 and 10:1, between 0.7:1 and 5:1, more preferably between 0.8:1 and 3:1, even more preferably between 0.9:1 and 2.5:1 or between 0.9:1 and 1.1:1.

Preferably, the total amount A+B is at least 10% by weight, in relation to the weight of the aqueous suspension to be dried.

Preferably, the total amount of silica A and fibres B is between 5% and 40% or between 10% and 30% by weight, in relation to the weight of the aqueous suspension to be dried.

Preferably, said fibres B are commercial sepiolite or modified sepiolite fibres (for example Pangel B5 by Tolsa) or modified as described for example in patent applications WO2016174629, WO2016174628 or WO2018078500A1 (IT102016000108318).

Optionally, the aqueous suspension to be dried may contain residues of the previous reactions, in amounts generally not higher than 3% by weight in relation to the suspension.

Preferably, the pH of the aqueous suspension to be dried is between 5 and 9.

Preferably, the liquid phase of the aqueous suspension comprises predominantly water (i.e. at least 80%, 90% or 95% by weight in relation to the weight of the liquid phase), more preferably the liquid phase consists of water alone.

Optionally, the aqueous suspension may comprise one or more alcohols such as ethanol, propanol, isopropanol or butanol, in amounts preferably less than 10% by weight in relation to the weight of the liquid phase.

The aqueous suspension to be dried may be prepared according to any possible operating mode, provided that the final composition is according to the above-mentioned preferences and is suitable for spraying.

In one embodiment, the aqueous suspension to be dried may be directly prepared by addition of the silica A and the fibres B, both in powder form, to the aqueous phase under stirring, according to known techniques.

In one embodiment, the aqueous suspension to be dried may be prepared by mixing two distinct aqueous suspensions, one comprising the silica A and the other the fibres B.

These suspensions, in turn, may be prepared according to different modes and concentrations according to known techniques.

For example, the suspensions may be prepared from the powders, for example from silica A, from fibres B or from a mixture thereof, by suspending them in an aqueous medium.

The powders may be commercial or prepared ad hoc, for example by filtration and subsequent drying of the respective filter cakes or mixtures thereof.

Typically the preparation of the powders, of silica A and of fibres B. comprises the separation of the solids from the reaction media by filtration, followed if necessary by washing.

Filtration may be carried out using any suitable technique, for example using press filters, band filters or rotating filters.

In an embodiment of the microbead preparation process according to the invention, in order to minimize dustiness, it is preferable to directly use the wet filtration cakes of silica A, of fibres B or both.

In this case, the aqueous suspension comprising said silica A and said fibres B is prepared starting from wet filtration cakes of silica A and of fibres B.

In this case, the amount of residual water contained in the cakes could be sufficient to provide, after appropriate disintegration, the aqueous suspensions with the correct viscosity, that is already suitable for nebulization. Alternatively, it is possible to proceed with routine adjustments of the quantity of water in order to make the final aqueous suspension suitable for nebulization.

In one embodiment, the wet filtration cakes of silica A and fibres B are disaggregated separately, and the two aqueous suspensions joined together to give the aqueous suspension to be dried suitable for nebulization.

In one embodiment, the wet filtration cakes of silica A and fibres B are pre-mixed and disaggregated together to give the aqueous suspension to be dried suitable for nebulization.

The wet filtration cake of silica A may generally have a residual water content of between 70 and 95% by weight, in relation to the total weight of the cake itself.

The wet filtration cake of fibres B may generally have a residual water content of between 70 and 95% by weight, in relation to the total weight of the cake itself.

The residual water content of the filtration cakes may be evaluated, for example, by thermogravimetric analysis.

The use of wet fibres, for example from previous operations to extract the fibres from the minerals from the aqueous phase or to modify them, also allows avoiding a drying step, with undoubted benefits in terms of time and costs.

The man skilled in the art, on the basis of the residual water content in the filtration cakes of A, B or a mixture thereof is able to add the appropriate amount of water during the disaggregation step or thereafter, in order to obtain a final aqueous suspension suitable for nebulisation drying.

The disaggregation of the filtration cakes may be carried out according to known techniques such as for example by mixing in ball mills or in colloid mills or with mechanical stirrers.

Optionally, the viscosity of the suspension to be dried may be further reduced by adding, preferably during the disaggregation, aluminium compounds, for example sodium aluminate, as described in document FR2536380.

Alternatively, it is possible to prepare the suspension to be dried by mixing the silica A and the fibres B preparation suspensions, without proceeding with the isolation of the solids by, for example, filtration. For example, subject to possible pH adjustment, the aqueous silica A suspensions may be used by acid precipitation of silicates according to known techniques and/or the aqueous suspensions of preparation or derivatization of the silicate fibres B, for example by derivatization with organic reagents or by acid depletion or by deposition of amorphous silica to yield the modified fibres.

Optionally, the man skilled in the art will be able to adjust the water volume of the final suspension, by partial evaporation or filtration or by dilution, or make other possible corrections of the medium to modify, for example, the rheology or viscosity or pH thereof in order to make the resulting suspension suitable for drying by nebulisation.

In a preferred embodiment, the process according to the present invention comprises the preparation of an aqueous suspension comprising precipitated amorphous silica A and sepiolite fibres or modified sepiolite fibres B in a weight ratio A/B of between 0.9:1 and 1.1:1 and in a total amount A+B equal to at least 10% by weight, in relation to the weight of the suspension, by disaggregation of the wet filtration cakes of said silica A and of said fibres B.

According to the present process, the final aqueous suspension is then subjected to nebulisation or spray drying to give the microbeads according to the invention.

Spray drying may be carried out with conventional spray apparatus, for example with spray driers with a turbine, spray driers with a nozzle, single or double fluid, or preferably with driers with a pressure nozzle, for example with driers such as those produced by GEA Group, SPX FLOW, ICF & WELKO SpA.

The temperature of the hot air of the spray drier may vary widely, generally being from 100 to 700° C., from 110 to 650° C. or from 120 to 600° C.

The spraying speed of the suspension to be dried depends on the type of apparatus, the size and the evaporative capacity, the temperature of the hot air, the solid content of the suspension to be dried and the spraying pressure.

The spraying pressure may vary widely, generally being from 10 to 80 bar, preferably from 15 to 60 bar or from 20 to 40 bar.

Preferably, the nebulisation nozzles of the atomizers have a hole with a diameter of between 1 and 3 mm.

The man skilled in the art is able to modify the operating conditions of the drier in the best way, in order to obtain microbeads of a certain diameter and granulometric distribution starting from the aqueous suspensions suitable for nebulisation described herein.

The preparation process of microbeads according to the invention allows preparing spheroidal particles (microbeads) of silicate fibres with needle-shaped morphology of nanometric size, preferably with an average diameter of at least 60, more preferably 70 or 80 microns The process according to the invention allows obtaining compact microbeads characterized by a reduced amount of fine particles, i.e. particles with an average diameter of less than 50 microns, responsible for the dustiness.

These fine particles are instead useful once the microbeads are incorporated in the elastomeric matrix as they result in high reinforcement performance.

Figure 2:
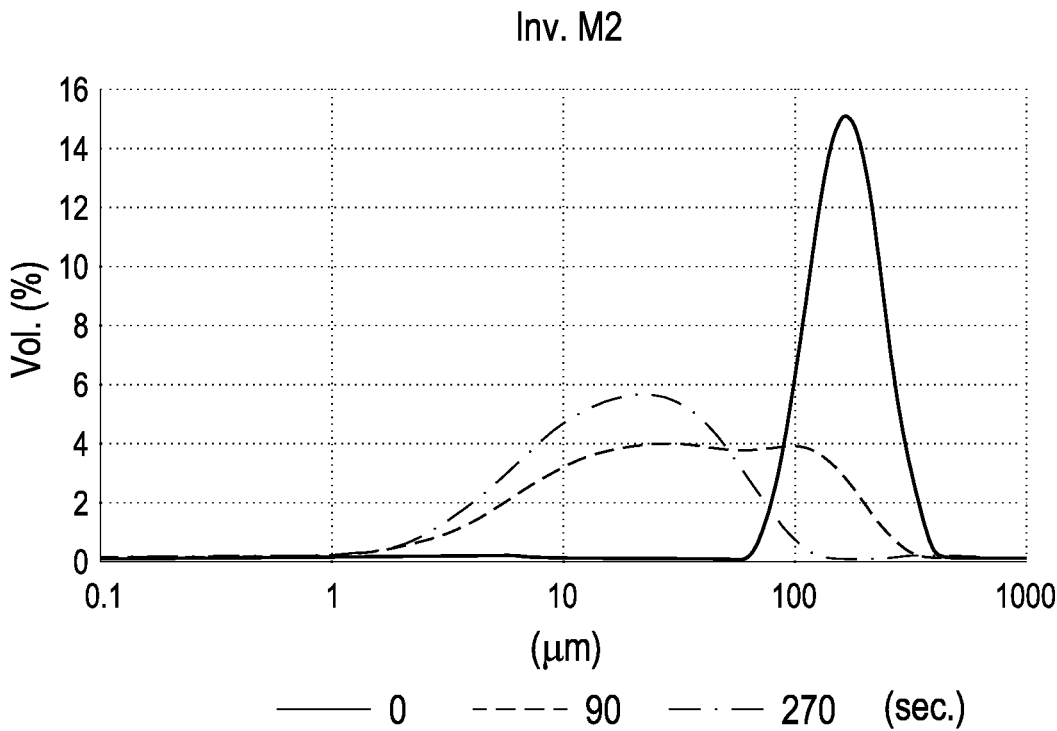
Figure 6:
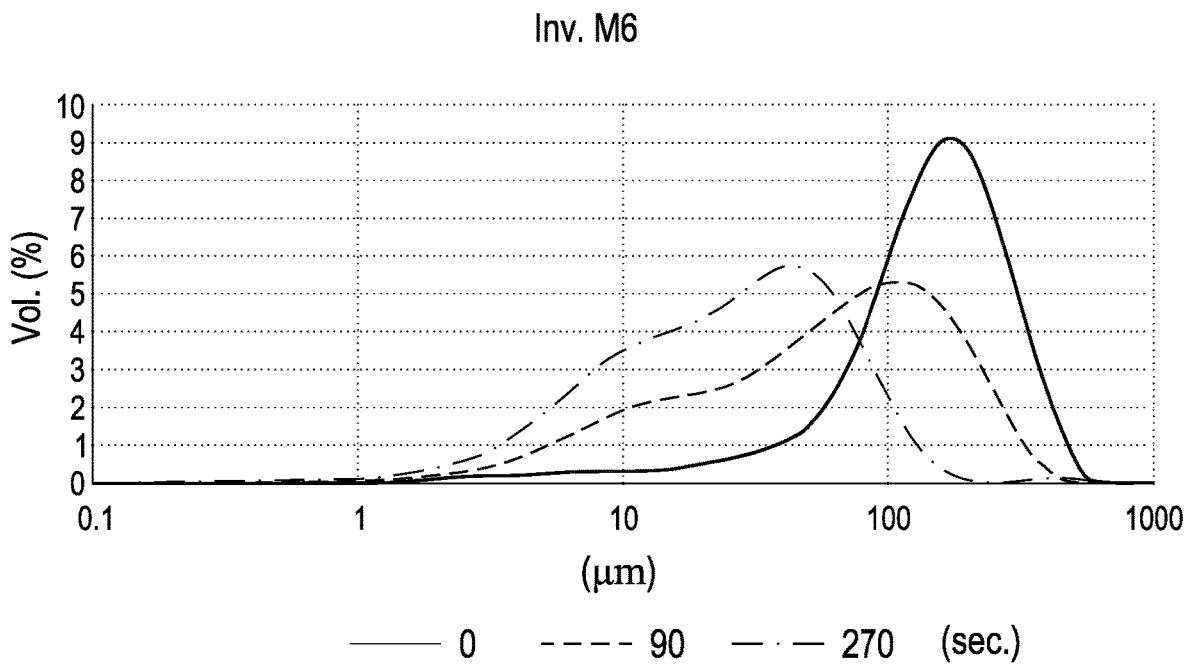

The good disgregability of the microbeads following mixing with the elastomer, highlighted for example in FIGS. 2 and 6, is another advantageous aspect of the invention.

Advantageously, the microbeads thus prepared are solid, non-pulverulent, homogeneous, with good flowability, excellent disaggregation and dispersability capacity in the elastomeric materials, and do not alter the reinforcing properties of the fibres B incorporated therein, as demonstrated in the present experimental part. The microbeads prepared according to the process of the invention allow the easy incorporation of silicate fibres with needle-shaped morphology of nanometric size in elastomeric compositions for tyres, avoiding the drawbacks associated with the use of these previously mentioned dusty fibres.

A further aspect of the present invention relates to an elastomeric composition for tyre components comprising the microbeads of the invention as described above.

The term "elastomeric composition for tyres" means a composition, comprising at least one diene elastomeric polymer and one or more additives, which by mixing provides an elastomeric compound suitable for use in tyre components.

The components of the elastomeric composition are not generally introduced all simultaneously in the mixer but typically added in sequence. In particular, vulcanisation additives, such as the vulcanising agent and possibly the accelerators and retardants, are usually added in a downstream step with respect to the incorporation and processing of all the other components.

In the final vulcanisable or vulcanised elastomeric compound, the individual components of the elastomeric composition do not always remain unchanged or are individually traceable as they may have been transformed, in whole or in part, due to the interaction with other components, heat and/or mechanical processing. The term "elastomeric composition" herein means to include the set of all the components that are added in the preparation of the elastomeric compound, regardless of whether they are all actually present simultaneously, are introduced sequentially or are then traceable in the final elastomeric compound or in the tyre.

The term "elastomeric compound" means a compound obtainable by processing at least one elastomeric polymer with at least one of the additives commonly used in the preparation of tyre compounds.

The term "non-vulcanisable elastomeric compound" means a mixture obtainable by processing at least one elastomeric polymer with at least one of the additives commonly used in the preparation of tyre compounds, excluding vulcanising agents.

The term "vulcanisable elastomeric compound" means an elastomeric compound ready for vulcanisation, which may be obtained by incorporation into a non-vulcanisable elastomeric compound of all additives, including vulcanization compounds.

The term "vulcanized elastomeric compound" indicates the material obtainable by vulcanization of a vulcanisable elastomeric compound.

The term green is generally used to indicate a material, a compound, a composition, a component or a tyre not yet vulcanised.

Preferably, said elastomeric composition for tyre components of the invention comprising at least (a) 100 phr of at least one diene elastomer,
(b) 2 to 110 phr of microbeads according to the invention,
(c) 0 to 110 phr of a standard reinforcing filler,
(d) 0.1 to 12 phr of a vulcanising agent, and
(e) 0.1 to 18 phr of a coupling agent.

The elastomeric composition for components of tyres according to the present invention is characterized by one or more of the following preferred aspects taken alone or in combination with one another.

The vulcanisable elastomeric composition for components of tyres according to the present invention comprises 100 phr of at least (a) one diene elastomeric polymer. Preferably, the diene elastomeric polymer (a) which may be used in the present invention can be selected from those commonly used in sulphur cross-linkable elastomeric materials, which are particularly suitable for producing tires, i.e. from elastomeric polymers or copolymers with an unsaturated chain having a glass transition temperature (Tg) generally less than 20° C., preferably within the range of 0° C. to –110° C. These polymers or copolymers may be of natural origin or may be obtained by polymerization in solution, emulsion polymerization or polymerization in gaseous phase of one or more conjugated diolefins, optionally mixed with at least one comonomer selected from monovinylarenes and/or polar comonomers in an amount not higher than 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof.

1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer (a) which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

According to a preferred embodiment, said vulcanisable elastomeric composition comprises at least 10% by weight, preferably between 20% by weight and 100% by weight, in relation to the total weight of said at least one diene elastomeric polymer (a), of natural rubber.

The above vulcanisable elastomeric composition may possibly comprise at least one elastomeric polymer of one or more monoolefins with an olefinic comonomer or derivatives thereof (a'). The monoolefins can be selected from: ethylene and α-olefins generally containing from 3 to 12 carbon atoms, such as for example propylene, 1-butene, 1-pentene, 1-hexene, 1-octene and mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

A diene elastomeric polymer (a) or an elastomeric polymer) (a') functionalized by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

The present vulcanisable elastomeric composition comprises microbeads comprising silicates fibres B with needle-shaped morphology of nanometric size and silica A, according to the invention.

The microbeads of the invention, used in amounts generally ranging from 2 to 110 phr, preferably from 5 to 100 phr, allow introducing into the elastomeric vulcanisable composition for tyres generally from 1 to 60 phr of fibres, without encountering all the drawbacks deriving from the handling and directly incorporating powdered material into a solid rubber. With the same conditions and mixing times, the microbeads of the invention allow a comparable dispersion of the fibres in the elastomeric matrix of the vulcanisable composition for tyres.

The preferences expressed above for the preparation process and for the microbeads are equally applicable, if relevant, to the microbeads when incorporated into the vulcanisable elastomeric composition for tyre components.

In a preferred embodiment of the present composition, the microbeads are present in such amounts as to provide silicate fibres (B) with needle-shaped morphology of nanometric size in amounts greater 15 phr, preferably in amounts of at least 20 phr, more preferably of at least 25 phr, even more preferably at least 30 phr.

In a preferred embodiment of the present composition, the microbeads are present in an amount such as to provide silicate fibres with needle-shaped morphology of nanometric size in amounts greater than 15 phr and lower than 73 phr, preferably in amounts from 20 phr to 60 phr, more preferably from 25 phr to 50 phr, even more preferably from 27 phr to 40 phr.

In a preferred embodiment, the elastomeric composition of the invention comprises at least
(a) 100 phr of at least one diene elastomer,
(b) microbeads according to the invention in an amount such as to provide silicate fibres with needle-shaped morphology of nanometric size (B) in amounts greater than 15 phr and lower than 73 phr, preferably in amounts of at least 20 phr and lower than 60 phr,
(c) less than 25 phr, preferably not more than 15 phr, of silica,
(d) 0.1 to 12 phr of a vulcanising agent, and
(e) 0.1 to 18 phr of a coupling agent.

In this preferred embodiment, the microbeads preferably comprise sepiolite fibres or modified sepiolite fibres.

In a preferred embodiment, the weight ratio of the total silica—that is, the sum of the amount of silica contained in the microbeads A and of that added conventionally as reinforcing filler (c)—and the silicate fibres with needle-shaped morphology of nanometric size (B) is preferably less than 2.7:1, more preferably less than 1.8:1, even more preferably it is 1:1 or less.

The Applicant has observed that surprisingly the microbeads of the invention, if added in significant quantities amounts to the elastomeric material, especially in the presence of limited amounts of silica, are able to modify the thermoplastic features of the material, once vulcanized, in particular to contrast the loss of module E' with the increase of the operating temperature, without impacting negatively on other properties such as hysteresis at 70° C. and mechanical properties related to the toughness of the material, such as AR and CR.

"Thermoplastic features" is meant to denote the tendency of the vulcanized elastomeric material to decrease its dynamic elastic modulus with increasing temperature.

The lower loss of module E' with the increase of the temperature of the preferred compositions described above in the tyre results in a maintenance of the driving performance within the entire operating temperature range.

The vulcanisable elastomeric composition according to the present invention may further comprise (c) a standard reinforcing filler.

By "standard reinforcing filler" it is meant a reinforcing filler commonly used in the tyre industry, preferably selected from among carbon black, precipitated amorphous silica, amorphous silica of natural origin, such as diatomaceous earth, calcium carbonate, titanium dioxide, talc, alumina, kaolin and mixtures thereof.

Preferably, the standard reinforcing filler (c) is carbon black having a surface area not smaller than 20 $m^2/g$ (as determined by STSA—statistical thickness surface area according to ISO 18852:2005).

Preferably, said carbon black reinforcing filler (c) is present in the vulcanisable elastomeric composition in an amount ranging between 1 phr and 120 phr, preferably between 20 phr and 90 phr.

Preferably, the standard reinforcing filler is silica, selected from a pyrogenic silica or, preferably, a precipitated silica, with a BET surface area (measured according to the ISO 5794/1 standard) of between 50 $m^2/g$ and 500 $m^2/g$, preferably between 70 $m^2/g$ and 200 $m^2/g$.

Preferably, the standard reinforcing filler (c) is present in the vulcanisable elastomeric composition in an amount generally ranging between 1 phr and 120 phr, preferably between 20 phr and 90 phr.

Preferably, the overall amount of reinforcement materials from the microbeads (b) and from the possible standard filler (c) present in the vulcanisable elastomeric composition according to the invention is at least 20 phr, more preferably at least 30 phr.

Preferably, the overall amount of reinforcement materials from the microbeads (b) and from the possible standard filler (c) present in the vulcanisable elastomeric composition according to the invention is in the range between 20 phr and 120 phr, more preferably between 30 phr and 90 phr.

Preferably, the vulcanisable elastomeric composition for tyres according to the present invention comprises a standard reinforcing filler (c) in amounts of less than 110 phr, 90 phr, or 60 phr, or does not include any standard reinforcing filler (c) in addition to the silica contained in the microbeads.

In a preferred embodiment, the composition of the invention comprises silica as a standard reinforcing filler (c) in amounts less than 25 phr, preferably in an amount not exceeding 15 phr.

Advantageously, by incorporating the present microbeads as the only reinforcement material, it is possible to avoid altogether the handling of dusty substances during the preparation step of the tyre compounds.

The vulcanisable elastomeric composition according to the present invention comprises at least one vulcanising agent (d).

The vulcanising agent most advantageously used is sulphur, or, alternatively, sulphur-containing molecules (sulphur donors), with accelerators, vulcanisation activators and/or retardants known by the man skilled in the art.

Sulphur or derivatives thereof may advantageously be selected, for example, from: (i) soluble sulphur (crystalline sulphur); (ii) insoluble sulphur (polymeric sulphur); (iii) sulphur dispersed in oil (such as 33% sulphur, known by the trade name Crystex OT33 from Eastman); (iv) sulphur donors such as, for example, caprolactam disulphide (CLD), bis[(trialkoxysilyl)propyl]polysulphides, dithiophosphates; and mixtures thereof.

The vulcanising agent (d) is present in the vulcanisable elastomeric composition of the invention in an amount from 0.1 to 15 phr, preferably from 0.5 to 10 phr, even more preferably from 1 to 7 phr.

The vulcanisable elastomeric composition according to the present invention can optionally further comprise at least one coupling agent (e) able to interact with the silicate fibres and the silica present as reinforcing filler and bind them to the diene elastomeric polymer during vulcanization.

Preferably, the vulcanisable elastomeric composition comprises at least one silane coupling agent (e).

Preferably, the silane coupling agent (e) that can be used in the present invention is selected from those having at least one hydrolyzable silane group, which may be identified, for example, by the following general formula (I):

$$(R)_3Si—C_nH_{2n}—X \qquad (I)$$

where the R groups, which may be the same or different, are selected from: alkyl, alkoxy or aryloxy groups or from halogen atoms, provided that at least one of the R groups is an alkoxy or aryloxy group or a halogen; n is an integer of between 1 and 6, inclusive; X is a group selected from: nitrous, mercapto, amino, epoxide, vinyl, imide, chlorine, —$(S)_m C_n H_{2n}$—Si—$(R)_3$ and —S—COR, where m and n are integers of between 1 and 6 inclusive and the R groups are as defined above.

Among the silane coupling agents, bis(3-triethoxysilylpropyl)tetrasulphide and bis(3-triethoxysilylpropyl)disulphide are particularly preferred. Said coupling agents may be used as such or as a suitable mixture with an inert filler (such as carbon black) so as to facilitate their incorporation into the vulcanisable elastomeric composition. Preferably, said silane coupling agent (e) is present in the vulcanisable elastomeric composition in an amount ranging between 0.1 phr and 20 phr, preferably between 0.5 phr and 10 phr.

Preferably, the vulcanising agent (d) is used in combination with vulcanisation accelerators (f) and activators (g) known by the man skilled in the art.

The accelerators (f) that are commonly used may be selected from: dithiocarbamates, guanidine, thiourea, thiazoles, sulphenamides, thiurams, amines, xanthates and mixtures thereof.

Preferably, the vulcanisation accelerators are present in the vulcanisable elastomeric composition of the invention in amounts from 0.1 to 8 phr, preferably from 0.3 to 6 phr.

Activators (g) that are particularly effective are zinc compounds, and in particular ZnO, ZnCO3, zinc salts of saturated or unsaturated fatty acids containing from 8 to 18 carbon atoms, such as, for example, zinc stearate, which are preferably formed in situ in the vulcanisable elastomeric composition from ZnO and fatty acid, as well as $Bi_2O_3$, PbO, $Pb_3O_4$, $PbO_2$, or mixtures thereof.

Preferably, the vulcanisation activators are present in the vulcanisable elastomeric composition of the invention in amounts from 0.2 to 15 phr, preferably from 0.5 to 10 phr.

Finally, the vulcanisable elastomeric materials described above may comprise other commonly used additives, selected on the basis of the specific application for which the composition is intended. For example, said materials may be admixed with: antioxidants, anti-ageing agents, plasticisers, adhesives, anti-ozone agents, modifying resins, or mixtures thereof.

In particular, in order to further improve the processability, said vulcanisable elastomeric composition may be admixed with at least one plasticiser generally selected from mineral oils, vegetable oils, synthetic oils, polymers with a low molecular weight and mixtures thereof, such as, for example, aromatic oil, naphthenic oil, phthalates, soybean oil and mixtures thereof. The amount of plasticiser generally ranges from 0 phr and 70 phr, preferably from 5 phr to 30 phr. The vulcanisable elastomeric compositions of the invention may be converted into the corresponding compounds by mixing together the polymeric components with the microbeads and with the other additives possibly present according to the techniques known in the art. The incorporation of the microbeads can take place with apparatus and according to conventional methods, which do not require particular modifications of the plants. The mixing can be performed, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

The vulcanisable elastomeric composition according to the present invention is preferably used to manufacture tyre components, green and then vulcanized, for vehicle wheels.

The vulcanisable elastomeric composition of the invention, after mixing, can be vulcanised according to known techniques, due to the presence of sulphur-based vulcanising systems commonly used for diene elastomeric polymers. To this end, after one or more thermomechanical processing steps, a vulcanising agent, preferably sulphur-based, is generally incorporated in the composition, preferably together with vulcanisation accelerators. In the final treatment step, the temperature is generally kept below 120° C. and preferably below 100° C., so as to prevent any undesired pre-crosslinking phenomena. Thereafter, the vulcanisable composition is incorporated in one or more components of the tyre and subjected to vulcanisation, according to known techniques.

A further aspect of the present invention is a tyre component comprising a vulcanisable or vulcanised elastomeric composition of the invention obtainable by vulcanisation thereof.

The tyre component according to the invention may be selected from among the tread, under-layer, anti-abrasive strip, sidewall, sidewall insert, mini-sidewall, under-liner, rubber layers, bead filler and sheet, preferably from among the anti-abrasive strip, tread, under-layer and sidewall insert.

Preferably, in the tyre according to the invention, at least one component selected from tread, under-layer, anti-abrasive strip, sidewall, sidewall insert, mini-sidewall, under-liner, rubber layers, bead filler and sheet comprises said vulcanisable or vulcanised elastomeric composition.

A further aspect of the present invention is a tyre for vehicle wheels comprising at least one component according to the invention.

An embodiment according to the present invention relates to a tyre for vehicles, preferably a high-performance tyre (for HP, SUV and UHP vehicles), comprising at least a carcass structure comprising at least a carcass ply having opposite lateral edges associated to respective bead structure;

one belt structure applied in radially outer position with respect to the carcass structure, one tread band applied in radially outer position with respect to said belt structure, and one or more components selected from under-layer, anti-abrasive strip, pair of sidewalls, sidewall insert, mini-sidewall, under-liner, rubber layer and sheet, wherein at least one of said carcass structure, tread band, belt structure, under-layer, anti-abrasive strip, pair of sidewalls, sidewall insert, mini-sidewall, under-liner, rubber layer, bead structure and sheet comprises said vulcanisable or vulcanised elastomeric composition described above.

Preferably, the tyre according to the invention comprises the above vulcanisable or vulcanised elastomeric composition in the tread and in one or more components selected from under-layer, anti-abrasive strip, pair of sidewalls, sidewall insert, under-liner, rubber layers, bead filler and sheet.

Preferably, the tyre according to the invention comprises the above vulcanised elastomeric material in the tread and in the under-layer.

In a preferred embodiment, the tyre according to the invention is a high performance tyre comprising an elastomeric composition according to the invention at least in the under-layer. Preferably, in this high performance tyre, the elastomeric composition of the under-layer comprises the microbeads of the invention in an amount such as to provide silicate fibres with needle-shaped morphology of nanometric size in amounts greater 15 phr, preferably in amounts of at least 20 phr, more preferably of at least 25 phr, even more preferably at least 30 phr.

Preferably in the high performance tyre, the under-layer composition comprises silica as standard reinforcing filler (c) in amounts of less than 25 phr, preferably not more than 15 phr.

Preferably in the composition of the under-layer of the high performance tyre of the invention, the weight ratio between the total silica in the composition and the silicate fibres with needle-shaped morphology of nanometric size (B) is less than 2.7:1, preferably less than 1.8:1, more preferably it is 1:1 or less.

In a preferred embodiment, the tyre according to the invention is a winter tyre comprising an elastomeric composition according to the invention at least in the under-layer. Preferably, in this winter tyre, the elastomeric composition of the under-layer comprises the microbeads of the invention in an amount such as to provide silicate fibres with needle-shaped morphology of nanometric size in amounts greater 15 phr, preferably in amounts of at least 20 phr, more preferably of at least 25 phr, even more preferably at least 30 phr.

Preferably in the winter tyre, the under-layer composition comprises silica as standard reinforcing filler (c) in amounts of less than 25 phr, preferably not more than 15 phr.

Preferably in the composition of the under-layer of the winter tyre of the invention, the weight ratio between the total silica in the composition and the silicate fibres with needle-shaped morphology of nanometric size (B) is less than 2.7:1, preferably less than 1.8:1, more preferably it is 1:1 or less.

Preferably, the tyre according to the invention comprises the vulcanisable or vulcanized elastomeric composition of the invention in the tread and in the pair of sidewalls.

The tyre according to the invention can be employed on two-, three- or four-wheeled vehicles, or on heavy vehicles, or on light transport vehicles.

The tyre according to the invention can be for summer or winter use or for all seasons.

The tyre according to the present invention can be manufactured according to a process which comprises:

building components of a green tyre on at least one forming drum;

shaping, moulding and vulcanising the tyre;

wherein building at least one of the components of a green tyre comprises:

manufacturing at least one green component comprising the vulcanisable elastomeric composition as described above.

The term green is generally used to indicate a material, a composition, a component or a tyre not yet vulcanised.

Figure 9:
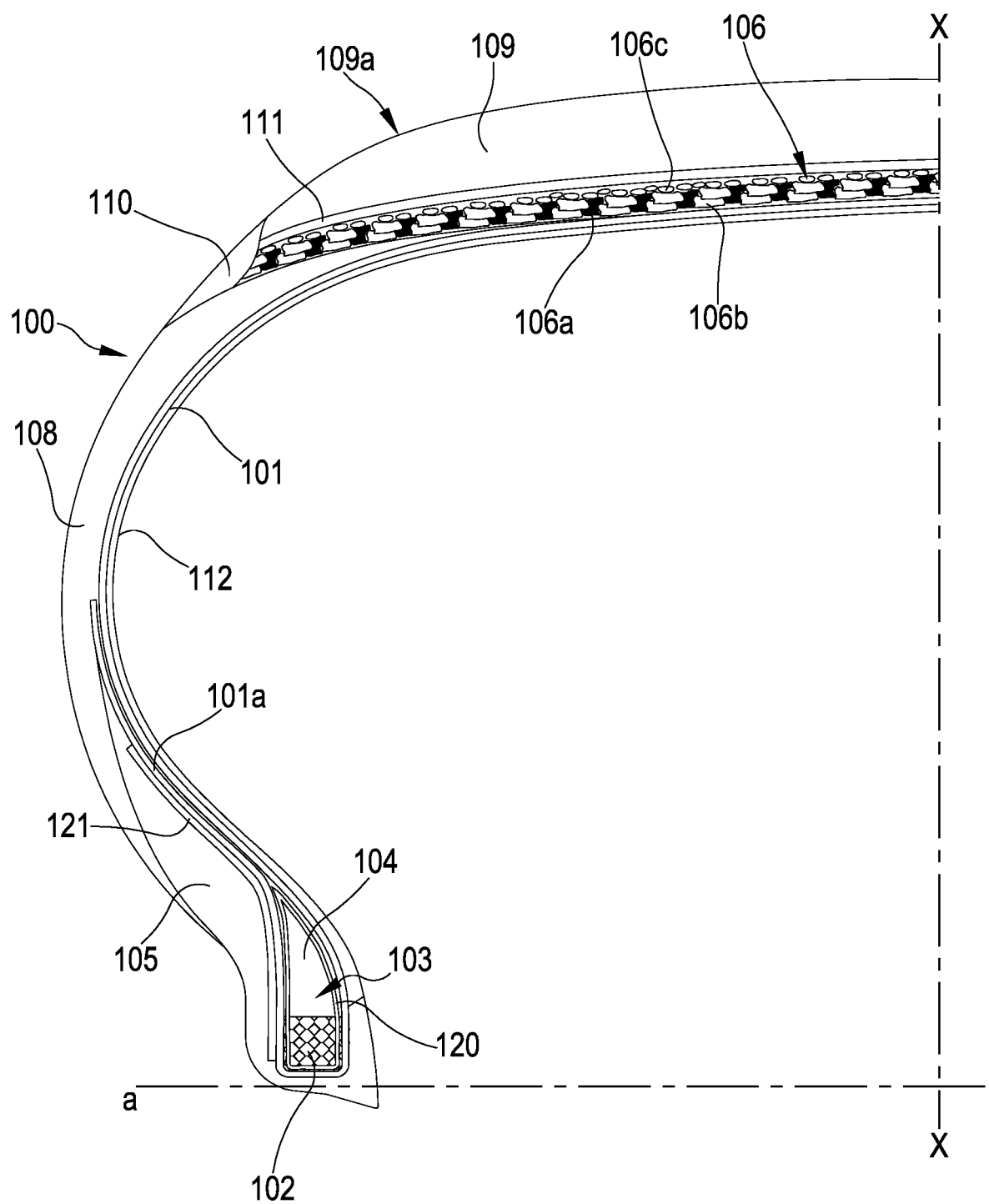

FIG. 9 shows a radial half-section of a tyre for vehicle wheels according to the invention.

In FIG. 9, "a" indicates an axial direction and "X" indicates a radial direction, in particular X-X indicates the outline of the equatorial plane. For simplicity, FIG. 9 shows only a portion of the tyre, the remaining portion not shown being identical and arranged symmetrically with respect to the equatorial plane "X-X".

Tyre 100 for four-wheeled vehicles comprises at least one carcass structure, comprising at least one carcass layer 101 having respectively opposite end flaps engaged with respective annular anchoring structures 102, referred to as bead cores, possibly associated to a bead filler 104.

The tyre area comprising the bead core 102 and the filler 104 forms a bead structure 103 intended for anchoring the tyre onto a corresponding mounting rim, not shown. The carcass structure is usually of radial type, i.e. the reinforcement elements of the at least one carcass layer 101 lie on planes comprising the rotational axis of the tyre and substantially perpendicular to the equatorial plane of the tyre. Said reinforcement elements generally consist of textile cords, such as rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called carcass flaps 101a as shown in FIG. 9.

In one embodiment, the coupling between the carcass structure and the bead structure can be provided by a second carcass layer, not shown in FIG. 9, applied in an axially outer position with respect to the first carcass layer.

An anti-abrasive strip 105 optionally made with an elastomeric composition according to the invention is arranged in an outer position of each bead structure 103.

The carcass structure is associated to a belt structure 106 comprising one or more belt layers 106a, 106b placed in radial superposition with respect to one another and with respect to the carcass layer, having typically textile and/or metallic reinforcement cords incorporated within a layer of vulcanised elastomeric material. Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of elongated reinforcement elements, typically metallic or textile cords, oriented in a substantially circumferential direction, thus forming an angle of a few degrees (such as an angle of between about 0° and 6°) with respect to a direction parallel to the equatorial plane of the tyre, and coated with vulcanised elastomeric material.

A tread band 109 of vulcanised elastomeric material is applied in a position radially outer to the belt structure 106.

Moreover, respective sidewalls 108 of vulcanised elastomeric material are applied in an axially outer position on the lateral surfaces of the carcass structure, each extending from one of the lateral edges of tread 109 at the respective bead structure 103.

In a radially outer position, the tread band 109 has a rolling surface 109a intended to come in contact with the ground. Circumferential grooves, which are connected by transverse notches (not shown in FIG. 9) so as to define a plurality of blocks of various shapes and sizes distributed over the rolling surface 109a, are generally made on this surface 109a, which for simplicity is represented smooth in FIG. 9.

An under-layer 111 of vulcanised elastomeric material can be arranged between the belt structure 106 and the tread band 109.

A strip consisting of elastomeric composition 110, commonly known as "mini-sidewall", of vulcanised elastomeric material can optionally be provided in the connecting zone between sidewalls 108 and the tread band 109, this mini-sidewall generally being obtained by co-extrusion with the tread band 109 and allowing an improvement of the mechanical interaction between the tread band 109 and sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

The rigidity of the tyre sidewall 108 can be improved by providing the bead structure 103 with a reinforcement layer 120 generally known as "flipper" or additional strip-like insert.

Flipper 120 is a reinforcement layer which is wound around the respective bead core 102 and the bead filler 104 so as to at least partially surround them, said reinforcement layer being arranged between the at least one carcass layer 101 and the bead structure 103. Usually, the flipper is in contact with said at least one carcass layer 101 and said bead structure 103.

Flipper 120 typically comprises a plurality of textile cords incorporated within a layer of vulcanised elastomeric material.

The bead structure 103 of the tyre may comprise a further protective layer which is generally known by the term of "chafer" 121 or protective strip and which has the function of increasing the rigidity and integrity of the bead structure 103.

Chafer 121 usually comprises a plurality of cords incorporated within a rubber layer of vulcanised elastomeric material. Such cords are generally made of textile materials (such as aramide or rayon) or metal materials (such as steel cords).

A layer or sheet of elastomeric material can be arranged between the belt structure and the carcass structure (not shown in FIG. 9). The layer can have a uniform thickness. Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer or sheet of elastomeric material as described above can be placed between said belt structure and said tread band, said additional layer or sheet extending preferably on a surface substantially corresponding to the extension surface of said belt structure.

The vulcanisable elastomeric composition according to the present invention, which comprises at least (a) 100 phr of at least one diene elastomer, (b) 2 to 110 phr of microbeads according to the invention, (c) 0 to 120 phr of a standard reinforcing filler, (d) 0.1 to 15 phr of a vulcanising agent, and (e) 0.1 to 20 phr of a coupling agent, can be advantageously incorporated in one or more of the components of the tyre selected from the belt structure, carcass structure, tread, under-layer, pair of sidewalls, mini-sidewall, sidewall insert, bead, flipper, chafer, sheet and anti-abrasive strip.

According to an embodiment not shown, the tyre may be a tyre for motorcycle wheels which is typically a tyre that has a straight section featuring a high tread camber.

According to an embodiment not shown, the tyre may be a tyre for heavy transport vehicle wheels, such as trucks, buses, trailers, vans, and in general for vehicles in which the tyre is subjected to a high load. Preferably, such a tyre is adapted to be mounted on wheel rims having a fitting diameter equal to or greater than 16 inches, more preferably equal to or greater than 17.5 inches for directional or trailer wheels. The term "tyre of heavy transport vehicles wheels" means a tyre intended for use in a vehicle belonging to categories M2, M3, N2, N3 and O2-O4, according to the "ECE 25 Consolidated Resolution of the Construction of vehicles (R.E. 3), Annex 7, Classification and definition of power driven vehicles and trailers", or to categories M3, N2, N3, O3, O4 according to "ETRTO Engineering design information" (edit. 2010), section "General Information", pages G15 and G16, chapter "International codes for wheeled vehicle classification as UN/ECE 29/78 30 and Directive 2003/37".

EXPERIMENTAL PART

For purely illustrative and non-limiting purposes, some examples of microbeads, according to the invention or comparative, of elastomeric compositions, compounds and tyres comprising them are given.

Evaluation Methods

Average Aspect Ratio

A statistical evaluation of the particle size of sepiolite and attapulgite was conducted. The Pangel S9, Pangel B5 sepiolite particles and Acti-Gel 208 attapulgite particles were measured with the digital image processing program Image J (open source). The statistical evaluation was performed by measuring the thickness and the length of the particles by analysing SEM images taken with the ZEISS Gemini SEM 500 instrument.

The samples were prepared by dispersing 1 mg of sepiolite in 5 ml of isopropanol. After sonication for 8 hours, a drop of solution was deposited directly on the support and the solvent was allowed to evaporate. Thereafter, a layer of graphite was deposited to make the sample more conductive.

For the statistical dissertation, 100 particles in length and width were analysed. The arithmetic means of the length and width measurements were calculated with the relative standard deviation. The (average) aspect ratio was calculated as the average of the aspect ratios of the particles.

Granulometry

The particle size distribution (PSD) measurement was performed using a Mastersizer 2000 laser diffraction instrument provided by Malvern Instruments, The instrument is powered by a Hydro 2000G dispersing unit supplied by Malvern Instruments. Approximately 0.25 g of microbead sample was dispersed in water by the Hydro 2000G unit (pump speed: 1250 rpm, stirrer speed: 500 rpm, without sonication). The suspension obtained was fed continuously to the Mastersizer 2000 and the DLS measurement was performed every 30 seconds (measurement time 10 seconds).

Microbead Stability

The microbeads, both comparative and according to the invention, were ultrasonicated for predetermined times in order to evaluate their resistance to stresses and the disgregability of the microbeads according to the procedure.

The particle stability measurement was performed using a Mastersizer 2000 laser diffraction instrument provided by Malvern Instruments. The instrument is powered by a Hydro 2000G dispersing unit supplied by Malvern Instruments. Using the fragmentation method, approximately 0.25 g of microbead sample was dispersed in water by the Hydro 2000G unit (pump speed: 1250 rpm, stirrer speed: 500 rpm, sonication power: 10% oscillation of the tip). The suspension obtained was fed continuously to the Mastersizer 2000 and the DLS measurement was performed every 30 seconds (measurement time 10 seconds). Proceeding in this way, the fragmentation process is followed in real time. Ideally, the microbeads should be sufficiently resistant so as not to release fine powders during preparation, storage and transport to the mixer, where they are incorporated into the elastomeric material.

However, during the mixing, it is desirable that the same are disaggregated to improve the dispersion of the fillers in the elastomeric matrix.

The extent of microbead disaggregation can be assessed by the change in the granulometric distribution curves before and after sonication, at subsequent times. This test simulates the action of the preparation, storage and transport of the microbeads and partially the action of the mixers on the microbeads themselves during their incorporation into the elastomeric material.

% Weight loss: (heating at 1000° C.) according to ASTM D7348,
Surface area (BET): according to ISO 18852.

Commercial Silica Microbeads

An example of commercial silica in microbeads is the commercial product Zeosil 1165MP from Solvay.

EXAMPLE 1

Preparation of Microbeads from a Mixture of an Organically Modified Suspension of Sepiolite Fibres B1 and a Precipitated Silica Suspension A1

1260 kg of organically modified sepiolite fibres (Pangel B5 by Tolsa) were added to about 13400 Kg of deionized water under stirring to obtain a suspension of sepiolite fibres B1 modified to 8.6% by weight of solid.

5762 Kg of a suspension in water A1 of silica precipitated at 20% by weight (equal to 1152 kg of silica) were added under stirring to suspension B1, so as to have a weight ratio A/B between silica and modified sepiolite fibres around 1:1. The silica used corresponds to the commercial grade Ebrosil H-155 AT.

The resulting suspension containing 11.8% by weight of solids (A1+B1) was dried by spray-drying, providing microbeads M2 including silica and modified sepiolite fibres in a 1:1 weight ratio. Spray drying was performed with a pressure nozzle. The dryer hot air temperature is between 400 and 500° C., the spraying pressure around 20 bar and the nebulisation spray nozzles of the nebulisers have a 2 mm diameter hole.

For comparative purposes, 1260 kg of organically modified sepiolite fibres Pangel B5 were suspended in 13400 Kg of water under stirring to obtain a suspension of sepiolite fibres B1 modified to 8.6% by weight of solid.

The suspension B1 was dried by nebulisation as described above, thereby providing comparative microbeads M1 of only modified sepiolite fibres.

The (comparative) microbeads M1 and M2 (invention) were subjected to granulometric analysis in water at time zero (t0) (microbeads as such), after 90 and after 270 seconds of ultrasonication (t90 and t270). The results of these granulometric analyses are shown in FIGS. 1 and 2.

As can be seen from the granulometric distribution curves at t0, the microbeads according to the invention M2, comprising modified sepiolite fibres and silica, are characterized by the absence of microparticulate (see in particular FIG. 2 the profile of the peak, narrow and sharp, between 70 and 420 microns). As appears from this curve, the smallest particles have an average hydrodynamic diameter measured by Dynamic Light Scattering in a water suspension of at least 70-80 microns.

On the contrary, the comparative microbeads M1 comprising only Pangel B5 modified sepiolite fibres, are characterized at t0 by the presence of a significant amount of microparticulate (see in particular the tail of the curve t0 between 1 and 100 microns), indicative of an excessive presence of fine powder.

Moreover, by observing the curves t90 and t270 of FIGS. 1 and 2, an early and substantial pulverization is noted in the case of the comparative microbeads M1, an index of excessive fragility, while the microbeads according to the invention M2 retain the granular structure for a longer time (see curve t90 in FIG. 2) and disaggregate only after prolonged sonication. These data are predictive of satisfactory resistance of the microbeads of the invention in the previous preparation, storage and transport steps and of sufficient disaggregation during incorporation into the elastomeric material.

EXAMPLE 2

Preparation of Microbeads from a Mixture of a Suspension of Modified Sepiolite Fibres with Acids B2 and a Precipitated Silica Suspension A2

2160 kg of sepiolite fibres (Pangel S9 from Tolsa) were added under stirring to 58000 Kg of deionized water. To the suspension, over a period of 5 hours, at 70° C., 339 kg of 98% by weight sulphuric acid and 2371 kg of deionized water were added to obtain a suspension of modified sepiolite fibres B2.

The resulting suspension B2 was mixed with 10800 kg of suspension A2 obtained after the reaction for the preparation of precipitated silica, containing 2160 kg of precipitated silica (weight ratio of silica:fibers of sepiolite modified in acids 1:1). The silica used corresponds to the commercial grade Ebrosil H-155 AT. The resulting suspension C2 is filtered on a filter press and washed with deionized water.

The cake thus obtained was mixed with deionized water and disaggregated to obtain a slurry of precipitated silica and sepiolite modified at 12% by weight of solid. This suspension is dried by nebulisation, providing the microbeads according to the invention M4A. Spray drying was performed with a pressure nozzle. The dryer hot air temperature is between 450 and 650° C., the spraying pressure around 20 bar and the nebulisation spray nozzles of the nebulisers have a 2 mm diameter hole.

In an alternative preparation, the suspension B2 prepared as above was mixed with the suspension A2 obtained after the reaction for the preparation of precipitated silica, containing 4320 kg of precipitated silica (weight ratio of silica:fibers of sepiolite modified in acids 2:1). The silica used corresponds to the commercial grade Ebrosil H-155 AT. The resulting suspension C3 is filtered on a filter press and washed with deionized water.

The cake thus obtained was mixed with deionized water and disaggregated to obtain a slurry of precipitated silica and sepiolite modified at 12% by weight of solid. This suspension was dried by nebulisation, providing the microbeads according to the invention M4B.

For comparative purposes, another aliquot of the suspension B2 containing 5 kg of acid-modified sepiolite fibres alone was filtered and washed with deionized water.

The wet cake thus obtained was dried in an oven at 80° C. for 12 hours, obtaining the comparative material M3.

The material obtained by simply drying the wet cake M3 (comparative) and the microbeads M4A (invention) were subjected to granulometric analysis at time zero (t0) (material as such), after 90 and after 270 seconds of ultrasonication (t90 and t270) in water. The results of these granulometric analyses are shown in FIGS. 3 and 4.

Figure 3:
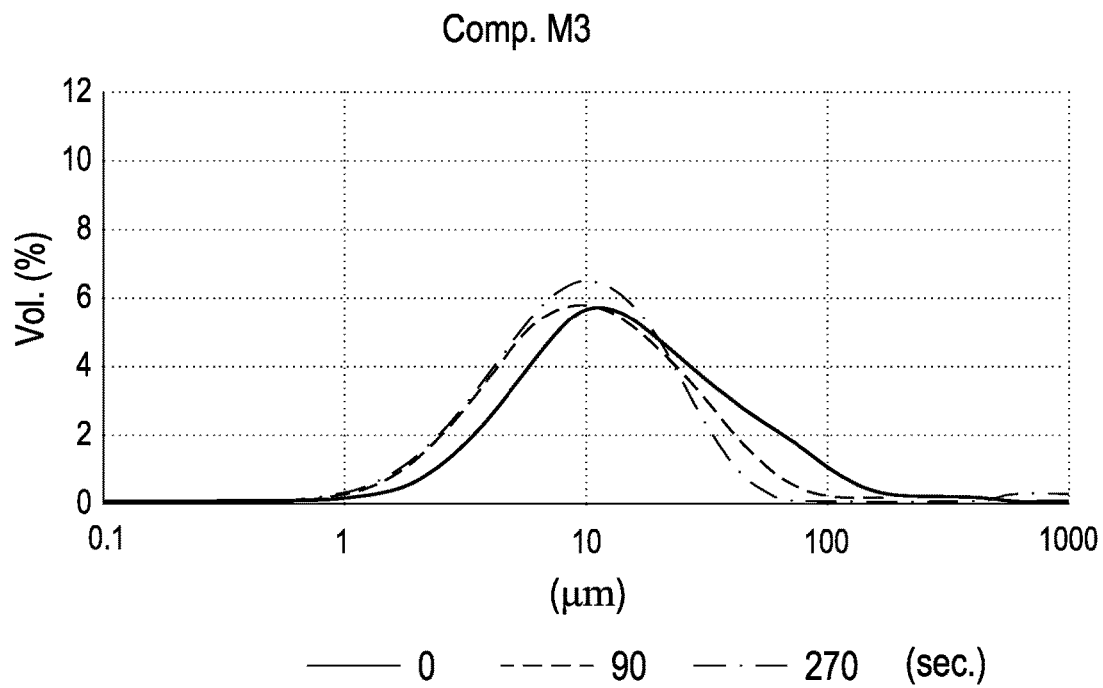
Figure 4:
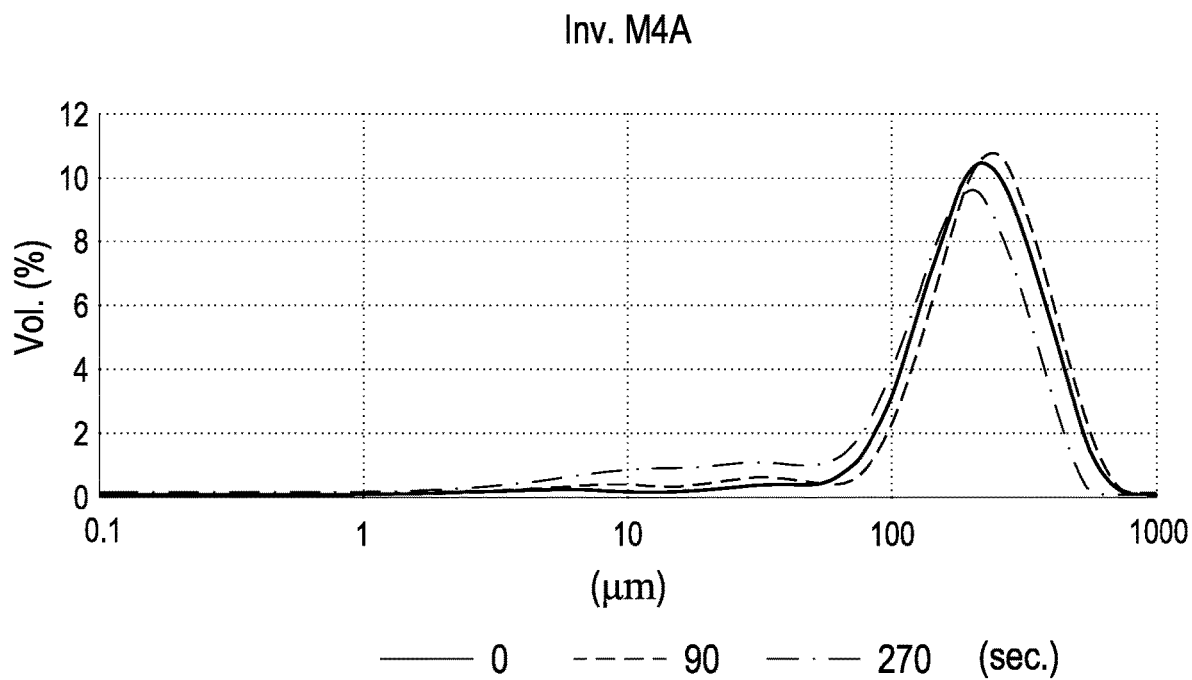

As can be seen in FIG. 3, the comparative material M3 was a fine powder, with an average diameter of about 10 microns, whereas the microbeads M4A according to the invention were predominantly aggregates with a diameter exceeding 70-80 microns. From the curves shown in FIG. 4, it is noted that the microbeads according to the invention M4A retained the structure substantially intact at time t90 while they were partially disaggregated at the time t270, indicating a good dispersibility in the elastomeric material upon mixing.

EXAMPLE 3

Preparation of Microbeads from a Mixture of a Suspension of Organically Modified Sepiolite Fibres with Acids B3 and a Precipitated Silica Suspension A2

2925 kg of organically modified sepiolite fibres (Pangel B5 from Tolsa) were added under stirring to 58000 Kg of deionized water. To the suspension, over a period of 5 hours, at 70° C., 360 kg of 98% by weight sulphuric acid and 2520 kg of deionized water were added to obtain a suspension of further modified sepiolite fibres B3.

The resulting suspension B3 was mixed with 14625 kg of suspension A2 obtained after the reaction for the preparation of precipitated silica, containing 2925 kg of precipitated silica (weight ratio of silica:fibers of sepiolite modified in acids 1:1). The silica used corresponds to the commercial grade Ebrosil H-155 AT. The resulting suspension C3 is filtered on a filter press and washed with deionized water.

The cake thus obtained was mixed with deionized water and disaggregated to obtain a slurry of precipitated silica and sepiolite modified at 12% by weight of solid. This suspension was dried by nebulisation, under conditions similar to example 1, providing the microbeads according to the invention M6.

For comparative purposes, another aliquot of the suspension B3 of organically and acid-modified sepiolite fibres alone was filtered and washed with deionized water. The wet cake thus obtained was dried in an oven at 80° C. for 12 hours, obtaining the comparative material M5.

Figure 5:
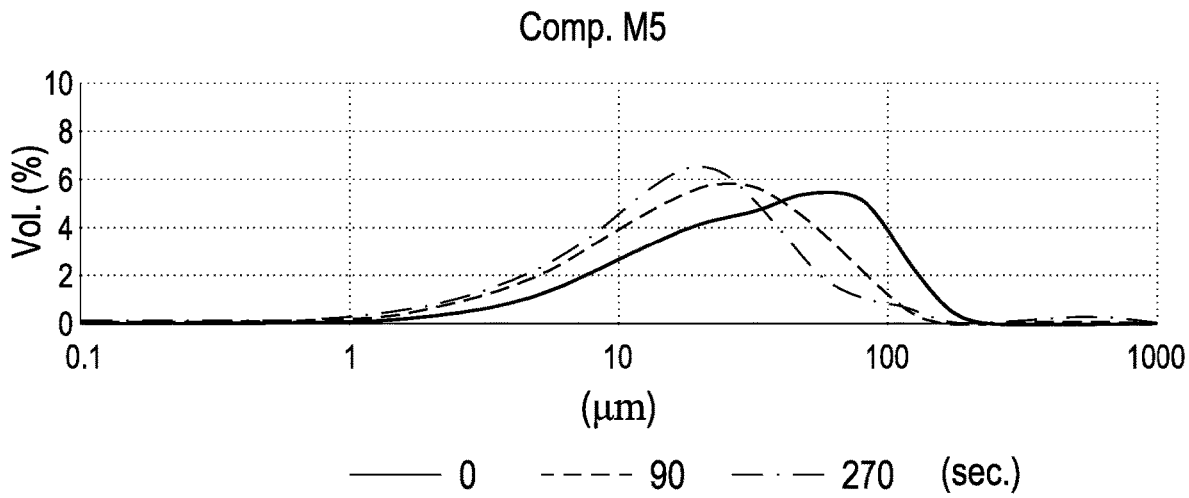

As appears from the granulometric distribution curves in FIG. 5, the comparative material M5, obtained by simply drying the wet filtration cake, was also characterized at time t0 by a significant fine powder component, with an average diameter well below 100 microns. This component visibly increased after 90 and above all 270 seconds of ultrasonication (curves t90 and t270). On the contrary, in the graph according to the invention in FIG. 6, it is noted that the microbeads M6 at t0 had an average diameter greater than 70 microns and only after ultrasonication (curves t90 and t270) they released finer particulate, indicating a good dispersibility in the elastomeric matrix.

EXAMPLE 4

Preparation of Microbeads Comprising Precipitated Silica and Paligorskite (Or Attapulgite)

Following the procedure described in Example 1, microbeads according to the invention (M8) were prepared, consisting of Ebrosil H155 AT silica and attapulgite (Acti-Gel 208 of Active Minerals) in a weight ratio of 5:1, and comparative microbeads (M9) consisting of attapulgite alone.

The microbeads according to the invention (M8) and comparative (M9) were characterized as shown in the following Table 1:

TABLE 1

| Sample | Weight loss % by heating | Surface area (BET) | % of particles <75 μm |
|---|---|---|---|
| M8 (silica:attapulgite 5:1) | 8.55 | 156 m$^2$/g | 8 |
| M9 (attapulgite) | 4.75 | 141 m$^2$/g | 23 |

In addition, the microbeads M9 (comparative) and the microbeads M8 (invention) were subjected to granulometric analysis at time zero (t0) (material as such) and after 390 seconds of ultrasonication (t390) in water. The results of these granulometric analyses are shown in FIGS. 7 and 8.

Figure 7:
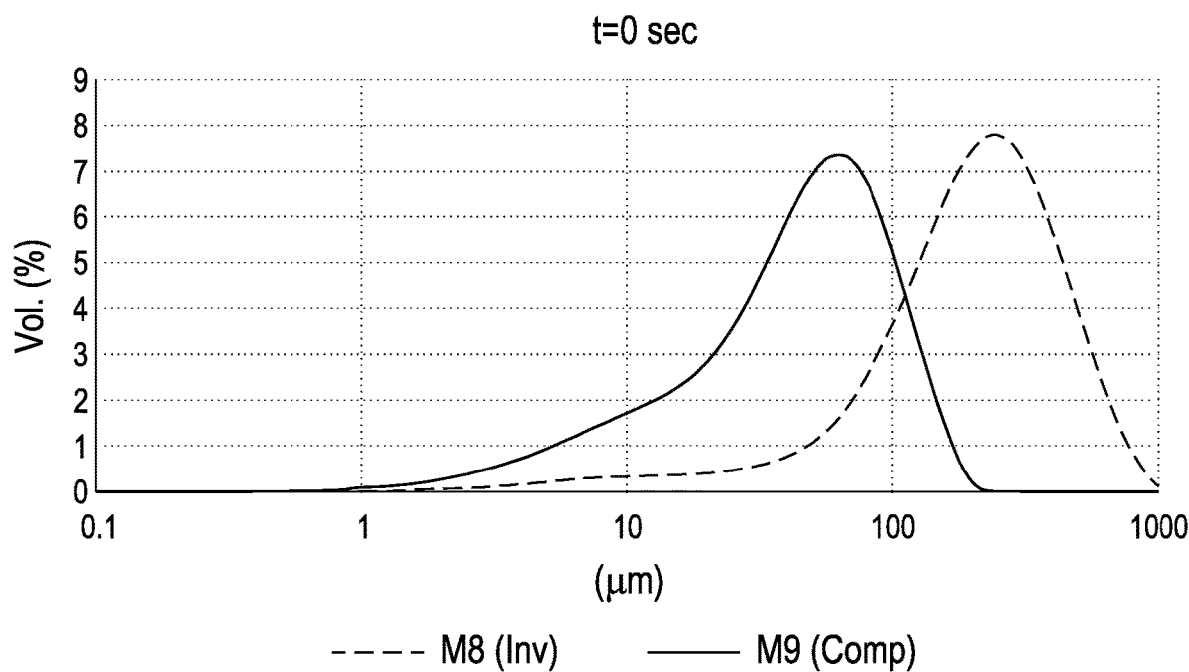
Figure 8:
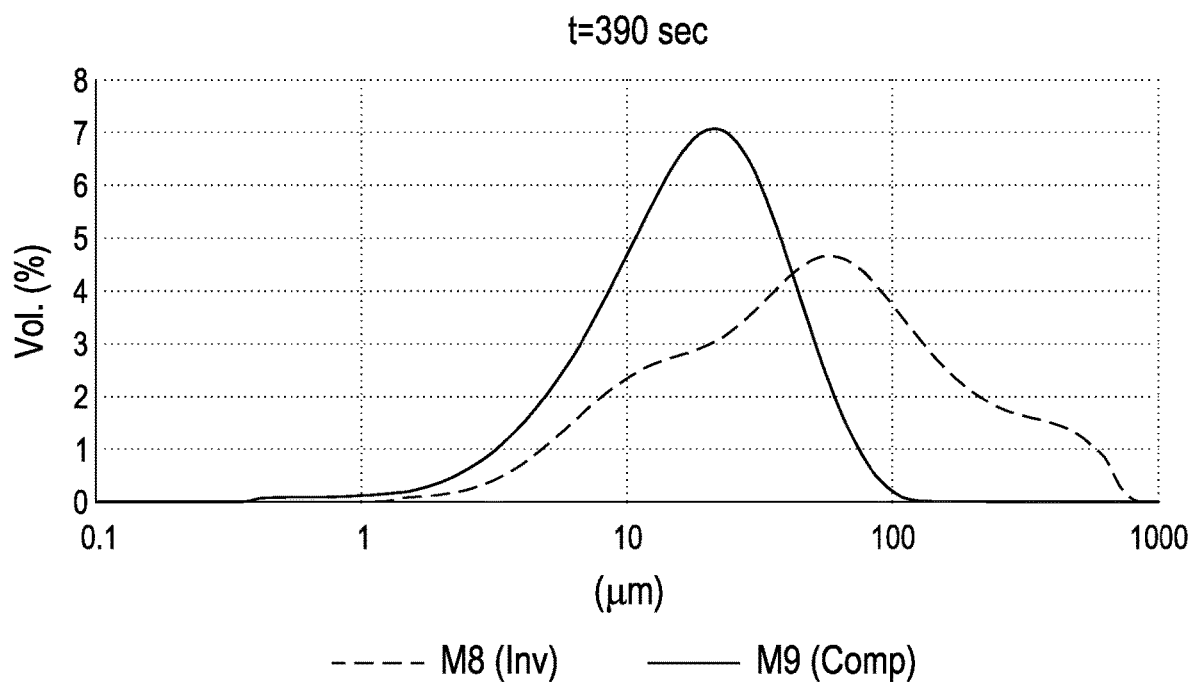

From the particle size distribution curves shown in FIG. 7, it is noted that the dimensions of the microbeads according to the invention (M8) were larger than those of the comparative microbeads (M9), although they were prepared starting from the same concentration of solid material in the mixture.

As can be seen in FIG. 7, the comparative microbeads M9 had an average diameter of about 16.8 microns and included fine powder whereas the microbeads M8 according to the invention were predominantly aggregated with a diameter exceeding 50 microns, thus characterized by a lower dustiness. From the curves shown in FIG. 8, it was noted that the microbeads M8 according to the invention were more resistant to crushing and therefore less prone to release fine powders in the handling and storage steps, but partially disaggregated at time t390, indicating however a good dispersibility in the elastomeric material following mixing.

EXAMPLE 5

Preparation of Elastomeric Compositions for Anti-abrasive Strip and Sidewall Insert of Tyres Including Materials M1-M6

Samples of vulcanized elastomeric materials were prepared to evaluate whether the incorporation of the microbeads of the invention (M2, M4A and M6) resulted in variations in the final properties of the materials with respect to similar materials prepared by directly introducing the same amounts of silica and of fibres directly and in separate form.

For this purpose, two elastomeric anti-abrasive strip compositions were prepared (Ex. 5A Comparative and Ex. 5B Invention) with the ingredients shown in the following Table 2:

TABLE 2

(anti-abrasive strip compositions)

| Components (phr) | Ex. 5A Comp. | Ex. 5B Inv. |
|---|---|---|
| NA | 70 | 70 |
| BR | 30 | 30 |
| Stearic acid | 1 | 1 |
| TESPT | 4 | 4 |
| N375 | 33 | 33 |
| Ebrosil H-155 AT | 16 | — |
| M1 (Pangel B5) | 16 | — |
| M2 (Silica:Pangel B5 1:1) | — | 32 |
| Zinc stearate | 2.5 | 2.5 |
| ZnO | 3.6 | 3.6 |
| 6PPD | 2 | 2 |
| TBBS | 1.75 | 1.75 |
| Sulphur | 4 | 4 | wherein

NR: CV 60 viscosity controlled natural rubber supplied by Von Bundit (Thailand)
BR: high-cis nebimadium polybutadiene (Europrene 40 Versalis)
Stearic acid: Stearin TP8 from Undesa
TESPT: Bis[3-(triethoxysilyl)propyl]tetrasulphide on carbon black
N375: carbon black (Cabot)
Ebrosil H-155 AT: precipitated synthetic amorphous silica (IQE)
ZnO: zinc oxide from Zincol Oxides
6-PPD: N-(1,3-dimethylbutyl)-N'-phenyl-p-phenylenediamine Santoflex from Eastman
TBBS: N-tert-butyl-2-benzothiazyl sulfonamide Rhenogran TBBS from Lanxess
Sulphur: S8 (soluble sulphur) from Zolfo Industria.
M1 and M2: comparative microbeads and according to the invention prepared in Example 1.

Furthermore, elastomeric compositions for sidewall insert were prepared (Ex. 5C and 5F Comparative and Ex. 5D, 5E and 5G Invention) with the ingredients shown in the following Table 3:

TABLE 3

(sidewall insert compositions)

| Components (phr) | Ex. 5C Comp. | Ex. 5D Inv. | Ex. 5E Inv. | Ex. 5F Comp. | Ex. 5G Inv. |
|---|---|---|---|---|---|
| BR | 60 | 60 | 60 | 60 | 60 |
| IR | 40 | 40 | 40 | 40 | 40 |
| Stearic acid | 2 | 2 | 2 | 2 | 2 |
| TESPT | 3.6 | 3.6 | 3.6 | 3.6 | 3.6 |
| N550 | 25 | 25 | 25 | 25 | 25 |
| Ebrosil H-155 AT | 20 | 12.5 | 5 | 20 | 11.5 |
| M3 (Pangel S9 acid treatment) | 7.5 | — | — | — | — |
| M4A (silica:Pangel S9 acid treatment 1:1) | — | 15 | — | — | — |
| M4B (silica:Pangel S9 acid treatment 2:1) | — | — | 22.5 | — | — |
| M5 (Pangel B5 acid treatment) | — | — | — | 8.5 | — |
| M6 (silica:Pangel B5 acid treatment 1:1) | — | — | — | — | 17 |
| ZnO | 4 | 4 | 4 | 4 | 4 |
| 6PPD | 2 | 2 | 2 | 2 | 2 |
| TBBS | 1.8 | 1.8 | 1.8 | 1.8 | 1.8 |
| Sulphur | 2.8 | 2.8 | 2.8 | 2.8 | 2.8 | wherein
IR: synthetic polyisoprene (NIZHNESKAMSK NEFTEKHIM)
N550: carbon black (Cabot)
M3, M4A, M4B, M5 and M6: materials prepared as described in Examples 2 and 3, and all the other ingredients are as defined in the previous Table 2.

All the elastomeric compositions of Examples 5A-5G were prepared according to the following general procedure: the elastomers were loaded into an internal mixer (Brabender or Banbury). The fillers (carbon black, silica, M1-M6) were added to the mixer and mixed for about 5 minutes. Stearic acid, TESPT, 6PPD and ZnO were then added, continuing the mixing. As soon as the temperature reached 145° C.±5° C., the elastomeric material was unloaded.

The material from the previous step was then introduced into an internal mixer (Brabender or Banbury), the vulcanising system was added and mixed at 90° C. for 3 minutes. The final elastomeric material (raw) was then discharged and air-cooled.

EXAMPLE 6

Preparation of Elastomeric Compositions for Tyre Under-layer Comprising the Material M2

Following the general procedure described in Example 5, elastomeric compositions for under-layer were prepared (Ex. 6A-6E Invention and Ex. 6F Comparative) with the ingredients shown in the following Table 4:

TABLE 4

(under-layer compositions)

| Components (phr) | Ex. 6A Inv. | Ex. 6B Inv. | Ex. 6C Inv. | Ex. 6D Inv. | Ex. 6E Inv. | Ex. 6F Comp. |
|---|---|---|---|---|---|---|
| IR | 100 | 100 | 100 | 100 | 100 | 85 |
| BR 1,2 syn | — | — | — | — | — | 15 |
| Stearic acid | 2 | 2 | 2 | 2 | 2 | 2 |
| TESPT | 3 | 3 | 3 | 3 | 3 | — |
| ZEOSIL 1165 MP | 45 | 35 | 25 | 15 | 0 | — |
| M2 (Pangel B5 + Silica 1:1) | 10 | 20 | 30 | 40 | 55 | — |
| Zinc stearate | 2 | 2 | 2 | 2 | 2 | 2 |
| ZnO | 3.5 | 3.5 | 3.5 | 3.5 | 3.5 | 3.5 |
| 6PPD | 3 | 3 | 3 | 3 | 3 | 3 |
| Novolac | 3 | 3 | 3 | 3 | 3 | 3 |
| N375 | 7 | 7 | 7 | 7 | 7 | 40 |
| N550 | — | — | — | — | — | 25 |
| EMMM | 3 | 3 | 3 | 3 | 3 | 3 |
| TBBS | 1.3 | 1.3 | 1.3 | 1.3 | 1.3 | 1.3 |
| Sulphur | 5.3 | 5.3 | 5.3 | 5.3 | 5.3 | 5.3 |
| wherein | | | | | | |
| Total silica | 50 | 45 | 40 | 35 | 27.5 | — |
| Pangel B5 | 5 | 10 | 15 | 20 | 27.5 | — |
| Total silica/Pangel B5 ratio | 25:1 | 4.5:1 | 2.7:1 | 1.75:1 | 1:1 | — | wherein
BR 1,2 syn: RB840 is a syndiotactic 1,2-butadienic rubber of JSR;
TESPT: Bis[3-(triethoxysilyl)propyl] tetrasuphide from Evonik;
Zeosil 1165MP: solvent synthetic amorphous silica Solvay;
Novolac: Alnovol PN 760 from Allnex;
EMMM: is hexamethoxymethylmelamine at 65% by weight on inert support, Cyrez 964 P.C. from Cytec,
Sulphur: is polysulfuric Crystex OT33 from Eastman;

M2 microbeads comprising Pangel B5 sepiolite fibres and silica in a 1:1 ratio prepared as described in Ex. 1, and the other ingredients are as defined in the above Tables 2 and 3.

The composition of Ex. 6F is a comparative sub-layer composition prepared following the suggestion of U.S. Pat. No. 8,695,663 to use a syndiotactic 1,2-butadiene rubber to impart a high modulus E' at 23° C. to the vulcanized elastomeric material, similar to that of the compositions of the invention of Examples 6D and 6E.

Evaluation of the Elastomeric Materials

Properties of Vulcanised Materials

The elastomeric materials prepared in the previous examples were vulcanised to give specimens on which analytical characterisations and the assessment of static and dynamic mechanical properties were conducted.

Unless otherwise indicated, vulcanisation was carried out in a mould, in hydraulic press at 170° C. and at a pressure of 200 bar for about 10 minutes.

The static mechanical properties were measured at 23° C. according to the ISO 37:2005 standard.

In particular, the load at different elongation levels (50%, 100% and 300%, named CA0.5, CA1 and CA3), the breaking load CR and the elongation at break AR% were measured on samples of the elastomeric materials mentioned above.

The tensile tests were carried out on straight axis Dumbell specimens.

The dynamic mechanical properties were measured using an Instron dynamic device in traction-compression mode according to the following methods.

A sample of the vulcanised elastomeric material having a cylindrical shape (length=25 mm; diameter=14 mm), subjected to pre-load compression up to 25% of the longitudinal deformation in relation to the initial length and maintained at the predetermined temperature (equal to +23° C. or 70° C.) for the whole duration of the test, was subjected to a dynamic sinusoidal strain having an amplitude of ±3.5% in relation to the length under pre-load, with a frequency of 100 Hz or 10 Hz. The dynamic elastic properties were expressed in terms of dynamic elastic modulus (E') and tan delta (loss factor). The Tan delta value was calculated as the ratio between the viscous dynamic module (E") and the dynamic elastic modulus (E').

The thermoplastic behaviour was evaluated as the ratio between the Delta E' difference between the values of elastic dynamic modulus measured at 100° C. and at 23° C. and the dynamic elastic modulus E' at 100° C. and expressing this ratio as a percentage. This percentage is typically negative because the dynamic modules E' decrease as the temperature increases. A marked thermoplastic behaviour is therefore evidenced by high absolute percentage values of the aforesaid ratio.

The following Tables 5 and 6 show the results of the analyses described above carried out on the respective samples:

TABLE 5

(anti-abrasive strip compositions)

| | Unit | Ex. 5A Comp. | Ex. 5B Inv. |
|---|---|---|---|
| Silica | phr | 16 | — |
| M1 (Pangel B5) | phr | 16 | — |
| M2 (Silica:Pangel B5 1:1) | phr | — | 32 |
| Properties of the vulcanised materials | | | |
| CA 0.5 | [MPa] | 2.95 | 2.67 |
| CA 1 | [MPa] | 5.71 | 5.18 |
| CA 3 | [MPa] | 17.07 | 16.95 |
| CR | [MPa] | 19.98 | 19.55 |

TABLE 5-continued (anti-abrasive strip compositions)

|  | Unit | Ex. 5A Comp. | Ex. 5B Inv. |
|---|---|---|---|
| AR | % | 378.0 | 374.4 |
| IRHD 23° C. | IRHD degrees | 78.1 | 76.3 |
| IRHD 100° C. | IRHD degrees | 72.0 | 71.3 |
| E' 23° C. 100 Hz | [MPa] | 16.29 | 16.13 |
| E' 70° C. 100 Hz | [MPa] | 12.73 | 12.87 |
| Tan Delta 23° C. 100 Hz |  | 0.208 | 0.204 |
| Tan Delta 70° C. 100 Hz |  | 0.133 | 0.129 |

TABLE 6

(sidewall insert compositions)

|  | Unit | Ex. 5C Comp. | Ex. 5D Inv. | Ex. 5E Inv. | Ex. 5F Comp. | Ex. 5G Inv. |
|---|---|---|---|---|---|---|
| Silica | phr | 20 | 12.5 | 5 | 20 | 11.5 |
| M3 (Pangel S9 acid treatment) | phr | 7.5 | — | — | — | — |
| M4A (silica: Pangel S9 1:1-acid treatment) | phr | — | 15 | — | — | — |
| M4B (silica: Pangel S9 2:1-acid treatment) | phr | — | — | 22.5 | — | — |
| M5 (Rangel B5 acid treatment) | phr | — | — | — | 8.5 | — |
| M6 (silica:Pangel B5 acid treatment 1:1) | phr | — | — | — | — | 17 |
| Properties of the vulcanised materials |  |  |  |  |  |  |
| CA 0.5 | [MPa] | 2.12 | 2.31 | 2.48 | 2.59 | 2.24 |
| CA 1 | [MPa] | 4.36 | 4.89 | 5.16 | 5.58 | 4.65 |
| CR | [MPa] | 8.82 | 9.55 | 13.0 | 10.57 | 9.34 |
| AR | % | 190.0 | 183.9 | 247.1 | 184.8 | 189.3 |
| IRHD 23° C. | IRHD degrees | 73.3 | 73.8 | 76.3 | 75.5 | 73.8 |
| IRHD 100° C. | IRHD degrees | 71.8 | 71.8 | 74.1 | 74.1 | 72.4 |
| E' 23° C. 100 Hz | [MPa] | 8.39 | 8.49 | 8.75 | 9.50 | 8.48 |
| E' 70° C. 100 Hz | [MPa] | 8.47 | 8.55 | 8.67 | 9.68 | 8.63 |
| Tan Delta 23° C. 100 Hz |  | 0.079 | 0.080 | 0.106 | 0.066 | 0.070 |
| Tan Delta 70° C. 100 Hz |  | 0.062 | 0.063 | 0.075 | 0.052 | 0.056 |

As can be seen from the data in Tables 5 and 6, the properties of the materials are substantially comparable. The repeatability of the mechanical performances with respect to the reference compound confirms the good dispersion and distribution of the fibres within the compound, both when the fibres are added separately with respect to the silica, and when incorporated with the silica in the microbeads. The improvement of the mechanical properties in the case of Example 5E of the invention, may suggest a more uniform dispersion of the fillers in the elastomeric material due to the better distribution of the fibres on a higher amount of silica in the microbead.

The following Table 7 shows the results of the analyses described above carried out on the respective vulcanized samples at 170° C. for 10 minutes:

TABLE 7

(under-layer compositions)

|  | Unit | Ex. 6A Inv | Ex. 6B Inv | Ex. 6C Inv | Ex. 6D Inv | Ex. 6E Inv | Ex. 6F Comp |
|---|---|---|---|---|---|---|---|
| Silica | phr | 45 | 35 | 25 | 15 | 0 | — |
| Microbeads M2 | phr | 10 | 20 | 30 | 40 | 55 | — |
| Property |  |  |  |  |  |  |  |
| CA 0.5 | [MPa] | 2.41 | 2.86 | 3.37 | 3.87 | 4.68 | 4.13 |
| CA 1 | [MPa] | 4.04 | 4.84 | 5.66 | 6.48 | 7.63 | 7.35 |
| CR | [MPa] | 21.20 | 21.24 | 21.20 | 20.27 | 20.32 | 14.82 |
| AR | % | 517.9 | 492.4 | 475.9 | 437.0 | 412.7 | 219.07 |
| E' 23° C. | [MPa] | 15.963 | 17.6 | 17.759 | 17.773 | 19.65 | 18.056 |

TABLE 7-continued (under-layer compositions)

| | Unit | Ex. 6A Inv | Ex. 6B Inv | Ex. 6C Inv | Ex. 6D Inv | Ex. 6E Inv | Ex. 6F Comp |
|---|---|---|---|---|---|---|---|
| E' 70° C. | [MPa] | 11.919 | 13.321 | 13.335 | 13.079 | 14.649 | 11.768 |
| E' 100° C. | [MPa] | 11.027 | 12.102 | 12.061 | 12.729 | 14.378 | 10.142 |
| Tan Delta 23° C. | — | 0.221 | 0.224 | 0.236 | 0.241 | 0.248 | 0.182 |
| Tan Delta 70° C. | — | 0.168 | 0.171 | 0.18 | 0.172 | 0.173 | 0.125 |
| Tan Delta 100° C. | — | 0.152 | 0.156 | 0.158 | 0.149 | 0.148 | 0.112 |
| % Variation of E' (from 23° to 100° C.) | — | −5% | −45% | −47% | −40% | −37% | −78% | wherein
E' and Tan deltas were measured at 10 Hz
the % variation of E' was calculated according to the formula $[(E'_{100°C.} - E'_{23°C.})/E'_{100°C.}] \times 100$ This value is indicative of the thermoplasticity of the material, i.e. its tendency to reduce its dynamic modulus when subjected to an increase in temperature.

The more negative this value, the higher the loss of modulus that the material exhibits when heated, Ideally, the under-layer in use should show a reduced thermoplasticity, in other words it should be kept sufficiently rigid as the operating temperature increases.

High material thermoplasticity can translate into the tyre in a variable road behaviour that is very sensitive to the operating temperature. This aspect is particularly important for those tires that have a very wide operating temperature range, such as four-season or winter tires, which are required to maintain performance consistently throughout the temperature range of use.

As can be seen from the values of E' at 23° C. and at 100° C. and their percentage variation, the compositions of the invention of Examples 6A, 6B and 6C have a certain thermoplasticity, i.e. a reduction of E' with increasing temperature, reduction that appears much more marked in the case of the comparative composition 6F.

The trend of the module E' of the latter composition, whose % variation is even −78%, shows that it is not decisive to incorporate in the material a lot of filler, in this case black carbon, to avoid the reduction of the module E' and therefore the deterioration of mechanical performance.

Not even the incorporation of silica in significant amounts—see the Ex. 6A-6C with an overall content of silica between 50 and 40 phr having a variation of the module E'−45% or −47%—even if it results in a less marked thermoplasticity, would seem sufficiently effective.

On the other hand, in samples 6D and even more 6E, in which the content of microbeads becomes significant, an entirely unexpected recovery of module E' is observed, which only drops by 40% and 37%, respectively.

The invention claimed is:

1. A microbead having an average diameter of at least 50 microns, comprising:
   A silica, and
   B silicate fibres with needle-shaped morphology of nanometric size,
   wherein the silica A and the silicate fibres B are present in a weight ratio of A to B ranging from 0.5:1 to 15:1 and in a total amount of A+B of at least 90% by weight of the microbead when dry, wherein the microbead is prepared by a process comprising:
   providing an aqueous suspension comprising the silica A and the silicate fibres B in a weight ratio of A to B ranging from 0.5:1 to 15:1, from 0.7:1 to 10:1, or from 0.7:1 to 5:1, and in a total amount of A+B of at least 5% (w/w) of the aqueous suspension, and
   drying the aqueous suspension by nebulisation.

2. The microbead according to claim 1, wherein the average diameter is at least 60, at least 70, or at least 80 microns.

3. The microbead according to claim 1, wherein the weight ratio of A to B ranges from 0.7:1 to 10:1, from 0.7:1 to 5:1, from 0.8:1 to 3:1, from 0.9:1 to 2.5:1, or from 0.9:1 to 1.1:1.

4. The microbead according to claim 1, wherein the silica A is a precipitated amorphous silica.

5. The microbead according to claim 1, wherein the silicate fibres B are chosen from fibres of sepiolite, fibres of palygorskite, fibres of wollastonite, fibres of imogolite, and said fibres when modified, and mixtures thereof.

6. The microbead according to claim 5, wherein the silicate fibres B are fibres of sepiolite modified by acid treatment or surface deposition of amorphous silica or derivatization with quaternary ammonium salts.

7. The microbead according to claim 1, wherein the silicate fibres B are present in an amount of at least 5% or at least 10% by weight of the microbead when dry.

8. The microbead according to claim 1, wherein:
   the silicate fibres B are sepiolite fibres or modified sepiolite fibres,
   the weight ratio of A to B ranges from 0.9:1 to 1.1:1, and
   the average diameter of the microbead is at least 70 microns.

9. A process for preparing a microbead comprising silica A and silicate fibres with needle-shaped morphology of nanometric size B comprising:
   providing an aqueous suspension comprising the silica A and the silicate fibres B in a weight ratio of A to B ranging from 0.5:1 to 15:1, from 0.7:1 to 10:1, or from 0.7:1 to 5:1, and in a total amount of A+B of at least 5% (w/w) or at least 10% (w/w) of the suspension, and
   drying the aqueous suspension by nebulisation,
   wherein the microbead has an average diameter of at least 50 microns, and
   wherein the microbead is prepared by a process comprising:
      providing an aqueous suspension comprising the silica A and the silicate fibres B in a weight ratio of A to B range from 0.5:1 to 15:1, from 0.7:1 to 10:1, or from 0.7:1 to 5:1, and in a total amount of A+B of at least 5% (w/w) of the aqueous suspension, and
      drying the aqueous suspension by nebulisation.

10. The process according to claim 9, wherein a liquid phase of the aqueous suspension comprises at least 80%, at least 90%, or at least 95% (w/w) water.

11. The process according to claim 9, wherein the aqueous suspension comprising the silica A and the silicate fibres B is prepared starting from wet filtration cakes of silica A and silicate fibres B.

12. A vulcanisable elastomeric composition for tyre components, comprising:
  (a) 100 phr of at least one diene elastomer,
  (b) 2 to 110 phr of microbeads,
  (c) 0 to 120 phr of a standard reinforcing filler,
  (d) 0.1 to 15 phr of a vulcanising agent, and
  (e) 0.1 to 20 phr of a coupling agent;
  wherein the microbeads have an average diameter of at least 50 microns and comprise
    A silica, and
    B silicate fibres with needle-shaped morphology of nanometric size,
    wherein the silica A and the silicate fibres B are present in a weight ratio of A to B ranging from 0.5:1 to 15:1 and in a total amount of A+B of at least 90% by weight of the microbeads when dry, and
  wherein the microbeads are prepared by a process comprising:
    providing an aqueous suspension comprising the silica A and the silicate fibres B in a weight ratio of A to B ranging from 0.5:1 to 15:1, from 0.7:1 to 10:1, or from 0.7:1 to 5:1, and in a total amount of A+B of at least 5% (w/w) of the aqueous suspension, and
    drying the aqueous suspension by nebulisation.

13. The elastomeric composition according to claim 12, wherein the silicate fibres B are present in an amount greater than 15 phr or of at least 20 phr, at least 25 phr, or at least 30 phr.

14. The elastomeric composition according to claim 12, comprising silica as the standard reinforcing filler (c) in an amount less than 25 phr or not exceeding 15 phr.

15. The elastomeric composition according to claim 12, wherein a weight ratio of total silica in the composition to silicate fibres B is less than 2.7:1, less than 1.8:1, or 1:1 or less.

16. The elastomeric composition according to claim 12, wherein
  the diene elastomer (a) is chosen from natural or synthetic 1,4-polyisoprene, 3,4-polyisoprene, polybutadiene, halogenated isoprene/isobutene copolymers, nonhalogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof;
  the standard reinforcing filler (c) is chosen from carbon black, precipitated amorphous silica, amorphous silica of natural origin, calcium carbonate, titanium dioxide, talc, alumina, kaolin, and mixtures thereof;
  the vulcanising agent (d) is chosen from (i) soluble sulphur (crystalline sulphur), (ii) insoluble sulphur (polymer sulphur), (iii) oil-dispersed sulphur, and (iv) sulphur donors; and
  the coupling agent (e) is a silane coupling agent having at least one hydrolysable silane group.

17. A vulcanisable or vulcanised elastomeric compound prepared by a process comprising mixing or mixing and vulcanizing an elastomeric composition comprising:
  (a) 100 phr of at least one diene elastomer,
  (b) 2 to 110 phr of microbeads,
  (c) 0 to 120 phr of a standard reinforcing filler,
  (d) 0.1 to 15 phr of a vulcanising agent, and
  (e) 0.1 to 20 phr of a coupling agent;
  wherein the microbeads have an average diameter of at least 50 microns and comprise
    A silica, and
    B silicate fibres with needle-shaped morphology of nanometric size,
    wherein the silica A and the silicate fibres B are present in a weight ratio of A to B ranging from 0.5:1 to 15:1 and in a total amount of A+B of at least 90% by weight of the microbeads when dry, and
  wherein the microbeads are prepared by a process comprising:
    providing an aqueous suspension comprising the silica A and the silicate fibres B in a weight ratio of A to B ranging from 0.5:1 to 15:1, from 0.7:1 to 10:1, or from 0.7:1 to 5:1, and in a total amount of A+B of at least 5% (w/w) of the aqueous suspension, and
    drying the aqueous suspension by nebulisation.

18. A tyre component comprising a vulcanised elastomeric composition comprising:
  (a) 100 phr of at least one diene elastomer,
  (b) 2 to 110 phr of microbeads,
  (c) 0 to 120 phr of a standard reinforcing filler,
  (d) 0.1 to 15 phr of a vulcanising agent, and
  (e) 0.1 to 20 phr of a coupling agent;
  wherein the microbeads have an average diameter of at least 50 microns and comprise
    A silica, and
    B silicate fibres with needle-shaped morphology of nanometric size,
    wherein the silica A and the silicate fibres B are present in a weight ratio of A to B ranging from 0.5:1 to 15:1 and in a total amount of A +B of at least 90% by weight of the microbeads when dry, and
  wherein the microbeads are prepared by a process comprising:
    providing an aqueous suspension comprising the silica A and the silicate fibres B in a weight ratio of A to B ranging from 0.5:1 to 15:1, from 0.7:1 to 10:1, or from 0.7:1 to 5:1, and in a total amount of A+B of at least 5% (w/w) of the aqueous suspension, and
    drying the aqueous suspension by nebulisation.

19. The tyre component according to claim 18, wherein the tyre component is chosen from tread, under-layer, anti-abrasive strip, sidewall, sidewall insert, mini-sidewall, under-liner, rubber layers, bead filler, and sheet.

20. A tyre for vehicle wheels comprising at least one component, wherein the at least one component comprises a vulcanised elastomeric composition comprising:
  (a) 100 phr of at least one diene elastomer,
  (b) 2 to 110 phr of microbeads,
  (c) 0 to 120 phr of a standard reinforcing filler,
  (d) 0.1 to 15 phr of a vulcanising agent, and
  (e) 0.1 to 20 phr of a coupling agent;
  wherein the microbeads have an average diameter of at least 50 microns and comprise
    A silica, and
    B silicate fibres with needle-shaped morphology of nanometric size,
    wherein the silica A and the silicate fibres B are present in a weight ratio of A to B ranging from 0.5:1 to 15:1 and in a total amount of A+B of at least 90% by weight of the microbeads when dry, and
  wherein the microbeads are prepared by a process comprising:
    providing an aqueous suspension comprising the silica A and the silicate fibres B in a weight ratio of A to B ranging from 0.5:1 to 15:1, from 0.7:1 to 10:1, or from 0.7:1 to 5:1, and in a total amount of A+B of at least 5% (w/w) of the aqueous suspension, and drying the aqueous suspension by nebulisation.

21. The tyre according to claim 20, wherein the average diameter of the microbeads is at least 70 microns, the weight ratio of A to B ranges from 0.9:1 to 1.1:1, the total amount of A+B is at least 90% by weight of the microbeads when dry, and the silicate fibres B are sepiolite fibres or modified sepiolite fibres.

* * * * *